(12) United States Patent
Rosenshine

(10) Patent No.: US 10,798,046 B1
(45) Date of Patent: *Oct. 6, 2020

(54) SYSTEM FOR INTEGRATING OFFSITE DATA RECORDS WITH ONLINE DATA RECORDS

(71) Applicant: Dorin Rosenshine, Great Neck, NY (US)

(72) Inventor: Dorin Rosenshine, Great Neck, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/730,959

(22) Filed: Dec. 30, 2019

Related U.S. Application Data

(60) Division of application No. 16/286,460, filed on Feb. 26, 2019, now Pat. No. 10,523,627, which is a (Continued)

(51) Int. Cl.
*H04L 12/58* (2006.01)
*H04L 29/08* (2006.01)
(Continued)

(52) U.S. Cl.
CPC ............. *H04L 51/32* (2013.01); *G06Q 10/10* (2013.01); *G06Q 10/107* (2013.01);
(Continued)

(58) Field of Classification Search
CPC combination set(s) only.
See application file for complete search history.

(56) References Cited

U.S. PATENT DOCUMENTS 6,334,110 B1  12/2001  Walter et al.
6,907,118 B2  6/2005  Henderson et al.
(Continued)

FOREIGN PATENT DOCUMENTS

EP  0829996 A2  3/1998
EP  2434736  3/2012

OTHER PUBLICATIONS

Freespee.com website [online] https://www.freespee.com/en/features/Plugins, 8 pages, 2014 [retrieved on Oct. 23, 2014].

*Primary Examiner* — Phung-Hoang J Nguyen
(74) *Attorney, Agent, or Firm* — Allen D. Hertz, P.A.; Allen D. Hertz

(57) ABSTRACT

A network system and methods utilized for tracking activities related to an event, such as audio communications, chats, text messages, completion of forms, and other user interactions. The method generates at least one identifier, distributes the identifier(s) to at least one system, and uses the identifier(s) to associate interactions with network-based content across different entities, whereby at least one interaction can be anonymous. The method involves receiving a request sent to a database stored on a computer readable medium in response to online activity and any collected or known user information, creating a record thereof in response to the request, generating an identifier associated therewith, generating a code corresponding thereto, and using the identifier to associate activities related to an event and user information. The association happens through remote communication with a system that interacts with the event.

29 Claims, 19 Drawing Sheets

Related U.S. Application Data continuation of application No. 15/698,922, filed on Sep. 8, 2017, now Pat. No. 10,218,666, which is a division of application No. 15/346,519, filed on Nov. 8, 2016, now Pat. No. 9,762,529, which is a division of application No. 14/973,639, filed on Dec. 17, 2015, now Pat. No. 9,491,249, which is a continuation-in-part of application No. 14/854,204, filed on Sep. 15, 2015, now Pat. No. 9,342,843, which is a division of application No. 14/524,949, filed on Oct. 27, 2014, now Pat. No. 9,137,360.

(60) Provisional application No. 62/041,779, filed on Aug. 26, 2014, provisional application No. 62/008,031, filed on Jun. 5, 2014, provisional application No. 61/974,600, filed on Apr. 3, 2014, provisional application No. 61/895,544, filed on Oct. 25, 2013, provisional application No. 62/094,259, filed on Dec. 19, 2014.

(51) Int. Cl.
*G06Q 30/02* (2012.01)
*H04M 3/42* (2006.01)
*G06Q 10/10* (2012.01)

(52) U.S. Cl.
CPC ..... *G06Q 30/0246* (2013.01); *G06Q 30/0255* (2013.01); *G06Q 30/0277* (2013.01); *H04L 67/1044* (2013.01); *H04L 67/22* (2013.01); *H04M 3/42042* (2013.01); *H04M 3/42382* (2013.01); *H04L 67/306* (2013.01); *H04M 2203/10* (2013.01); *H04M 2203/551* (2013.01)

(56) References Cited

U.S. PATENT DOCUMENTS

| | | |
|---|---|---|
| 8,259,915 B2 | 9/2012 | Berk |
| 8,442,862 B2 | 5/2013 | Lieberman et al. |
| 8,799,458 B2 | 8/2014 | Barber |
| 9,177,067 B2 | 11/2015 | Kawecki, III |
| 2002/0110233 A1 | 8/2002 | Henderson et al. |
| 2008/0013702 A1 | 1/2008 | Melideo |
| 2008/0267377 A1 | 10/2008 | Siegrist |
| 2010/0036749 A1 | 2/2010 | Barber |
| 2010/0322404 A1 | 12/2010 | Coleman et al. |
| 2011/0071910 A1 | 3/2011 | Dresden |
| 2011/0093328 A1* | 4/2011 | Woolcott ............ G06Q 30/0277 705/14.41 |
| 2011/0161951 A1 | 6/2011 | Anderson et al. |
| 2011/0282946 A1 | 11/2011 | Keohane et al. |
| 2012/0011202 A1* | 1/2012 | Occhino ................. H04L 67/22 709/204 |
| 2012/0150641 A1 | 6/2012 | Dobbs |
| 2012/0259686 A1 | 10/2012 | Yurow |
| 2013/0102274 A1 | 4/2013 | Lauwaert |
| 2013/0279670 A1 | 10/2013 | Wisman |
| 2013/0279671 A1 | 10/2013 | Wisman |
| 2013/0317993 A1 | 11/2013 | Wasserman et al. |
| 2014/0089418 A1* | 3/2014 | Davenport .............. H04L 51/16 709/206 |
| 2014/0120864 A1 | 5/2014 | Manolarakis |
| 2014/0257965 A1 | 9/2014 | Chung |
| 2015/0016661 A1* | 1/2015 | Lord ....................... H04L 51/10 382/100 |

\* cited by examiner

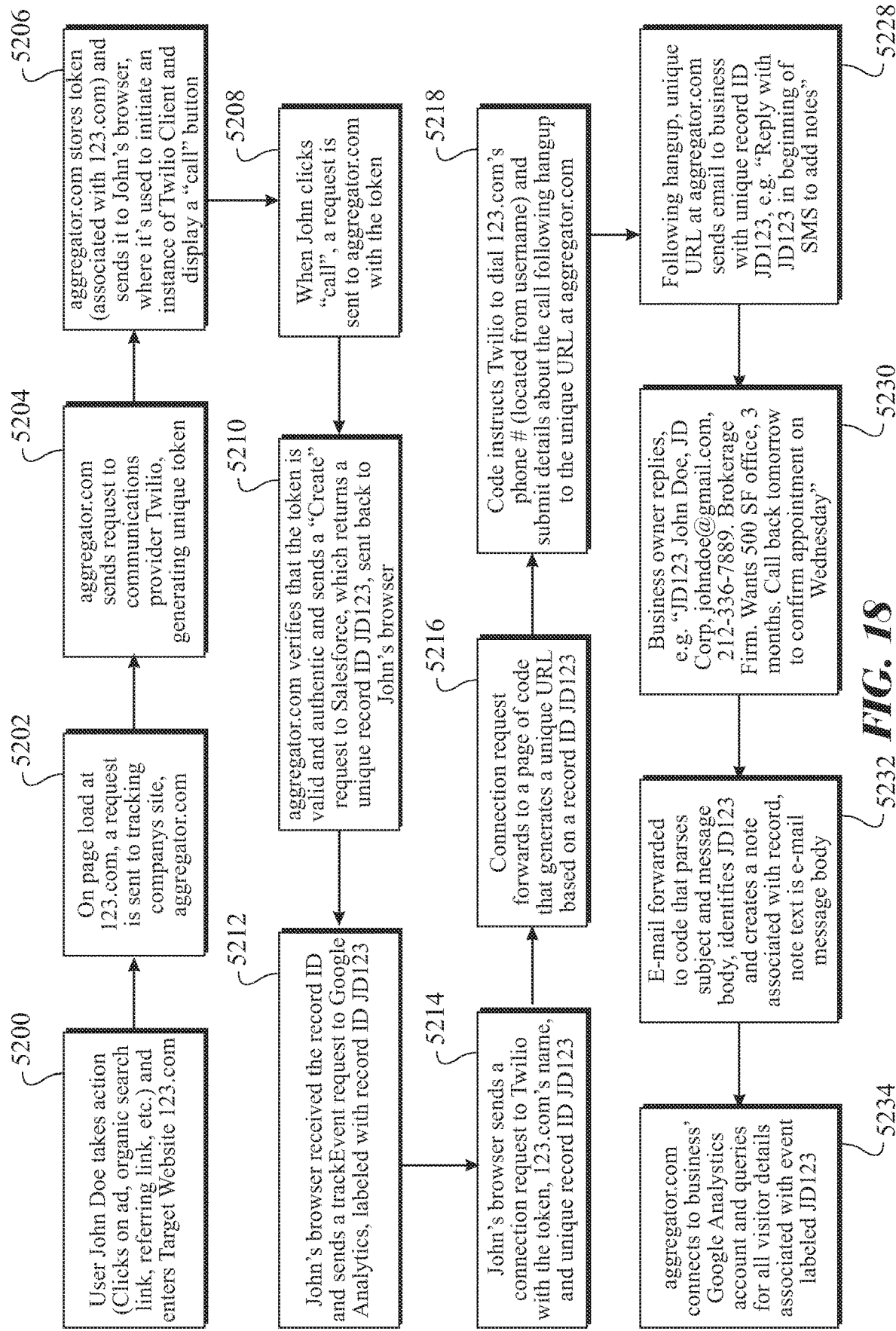

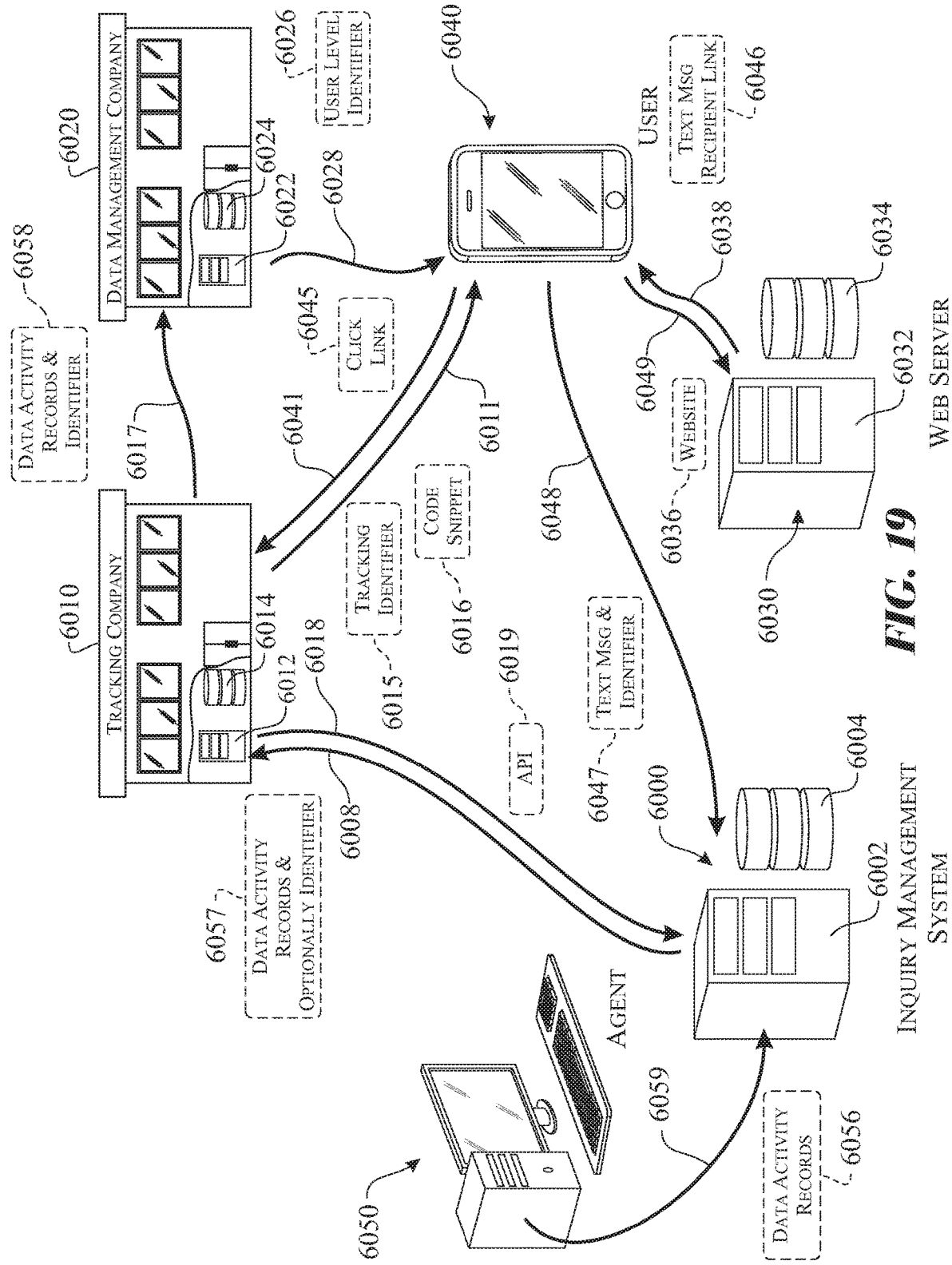

SYSTEM FOR INTEGRATING OFFSITE DATA RECORDS WITH ONLINE DATA RECORDS

CROSS REFERENCE TO RELATED APPLICATIONS

This United States Non-Provisional Utility Patent Application is:

(A) a Divisional Patent Application claiming the benefit of:

United States Non-Provisional Utility Application Ser. No. 16/286,460, filed on Feb. 6, 2019 (scheduled to issue as U.S. Pat. No. 10,523,627 on Dec. 31, 2019), wherein United States Non-Provisional Utility Application Ser. No. 16/286,460 is a Divisional Application claiming the benefit of United States Non-Provisional Utility Application Ser. No. 15/698,922, filed on Sep. 8, 2017 (now U.S. Pat. No. 10,218,666, issued on Feb. 26, 2019), wherein United States Non-Provisional Utility Application Ser. No. 15/698,922 is a Divisional Application claiming the benefit of United States Non-Provisional Utility Application Ser. No. 15/346,519, filed on Nov. 8, 2016 (now U.S. Pat. No. 9,762,529 on Sep. 12, 2017), wherein United States Non-Provisional Utility Application Ser. No. 15/346,519 is a Divisional Application claiming the benefit of United States Non-Provisional Utility Application Ser. No. 14/973,639, filed on Dec. 17, 2015 (scheduled to issue as U.S. Pat. No. 9,491,249 on Nov. 8, 2016), (B) in a first branch:

United States Non-Provisional Utility Application Ser. No. 14/973,639 is a Continuation-In-Part claiming the benefit of United States Non-Provisional Utility Application Ser. No. 14/854,204, filed on Sep. 15, 2015 (now issued as U.S. Pat. No. 9,342,843, issued on May 17, 2016), wherein United States Non-Provisional Utility Application Ser. No. 14/854,204 is a Divisional Patent Application claiming the benefit of United States Non-Provisional Utility Application Ser. No. 14/524,949, filed on Oct. 27, 2014 (now issued as U.S. Pat. No. 9,137,360, issued on Sep. 15, 2015), which claims the benefit of each as follows:

wherein United States Non-Provisional Utility Application Ser. No. 14/524,949 is a Non-Provisional Application claiming the benefit of U.S. Provisional Patent Application 62/041,779, filed on Aug. 26, 2014;

wherein United States Non-Provisional Utility Application Ser. No. 14/524,949 is a Non-Provisional Application claiming the benefit of U.S. Provisional Patent Application 62/008,031, filed on Jun. 5, 2014;

wherein United States Non-Provisional Utility Application Ser. No. 14/524,949 is a Non-Provisional Application claiming the benefit of U.S. Provisional Patent Application 61/974,600, filed on Apr. 3, 2014; and wherein United States Non-Provisional Utility Application Ser. No. 14/524,949 is a Non-Provisional Application claiming the benefit of U.S. Provisional Patent Application 61/895,544, filed on Oct. 25, 2013; and (C) in a second branch:

wherein United States Non-Provisional Utility Application Ser. No. 14/973,639, filed on Dec. 17, 2015 (now issued as U.S. Pat. No. 9,491,249, issued on Nov. 8, 2016) is a Non-Provisional Application claiming the benefit of U.S. Provisional Patent Application 62/094,259, filed on Dec. 19, 2014;

(C) each of which is incorporated by reference herein in their entireties.

FIELD OF THE PRESENT INVENTION

The present disclosure generally relates to a method for associating at least two user interactions with network-based entities, where at least one of the interactions is anonymous in nature. The method issues and subsequently employs a tracking identifier to associate multiple interactions or events of a user. More particularly, the present invention is directed towards a method for recording information related to events, then associating the recorded information with information (about the sending or receiving party) collected by external systems, such as web analytics software, advertising platforms, or phone systems, and managing the information.

BACKGROUND OF THE PRESENT INVENTION

Businesses commonly advertise through many different media in order to attract leads. Advertisements (commonly referred to as "ads") reach customers by way of a variety of modalities including: online websites, printed publications, radio and television broadcasts, direct mailings, emails, and other mediums in which customers are likely to receive the ads.

Increasingly, businesses are focusing their advertising efforts on online or Internet advertisements. As online advertising spending continues to climb, there is a strong interest in being able to attribute customer actions to a particular advertisement or marketing channel. Actions that occur during a visit to a website, such as submitting an inquiry form, downloading a file, and the like, can be tracked and associated with other visitor information including: a visitor source channel, a searched keyword term, and the like. However, offline actions, such as Short Message Services (SMS), Multimedia Messaging Services (MMS), and the like (commonly referred to as text messages), cannot typically be tracked in the same manner.

Current methods for associating text messages with visitor data involve assigning a unique telephone number to each advertisement created. In this scenario, if a visitor sends a text message to a business by way of a particular telephone number, it can be assumed that the visitor viewed the associated advertisement that displayed that specific telephone number. This method of associating a text message with a website visit is inefficient because it requires a business to purchase a large number of telephone numbers such that each advertisement can be associated with its own telephone number.

Another alternative known method involves dynamically assigning forwarding telephone numbers for each visit and/or page-view. This alternative known method creates an increasing uncertainty when the number of visitors and page-views increases and/or when tracked details are more refined. For example, tracking keywords compared to merely tracking all visits from organic searches. This is because a finite number of telephone numbers are spread and recycled through an increasing number of possible visit information combinations. For instance, if an interior design company merely tracked a visitor source, all visits from organic searches would be assigned the same telephone number. However, to track each keyword searched, a unique telephone number would be assigned to each phrase. Thus, "sofa upholstery" and "couch upholstery" would require different telephone numbers. Since the business owns a finite pool of telephone numbers, which are dynamically assigned and reused, the method of dynamically assigning and reusing the telephone numbers increases the likelihood that an identical phone number would be reused frequently enough to render the system error-prone.

Additionally, if the telephone number is displayed on multiple areas on the web page, this method would not be capable of disclosing which telephone number a visitor clicked to text. Such data would be important for a business attempting to understand which area of the web page attracts the attention of the visitors. To accomplish this with the current method, a business would need to feature different telephone numbers on the same page, which would be impractical.

Furthermore, the current method for associating a chat or text message with a website visit uses analytics collected by the SMS or a chat tracking system independently, which does not connect the tracking to the website's existing web analytics system. This approach limits the availability of data, since the website's analytics system specializes in collecting a wide array of visitor data.

Additionally, current tracking methods interfere with the branding efforts of businesses, as it may be desirable for customers to associate a particular business with a particular or memorable telephone number.

Furthermore, traditional tracking methods involve passing an SMS through the mentioned tracking numbers, which incurs charges based on the usage of the network associated with these numbers (for instance, per SMS sent or received). For a business with substantial SMS volume, the cost associated with such a setup is significant.

What is desired is a method for connecting text messages and chat data to one or more computer systems that issue user-level identifiers. The desired method would unleash a stream of opportunities for improved analytics and operations of a business.

BRIEF SUMMARY OF THE PRESENT INVENTION

Introduced here is technology for associating at least two standalone user interactions where at least one of the interactions is anonymous. Thus, a network-based entity, such as a website or mobile application, generates an identifier and associates the generated identifier with certain user activity. The entity incorporates the identifier into properties that lead the user off the entity. For instance, the entity may incorporate the identifier into a link (for example, as a query string, a query parameter, and the like) that, when clicked or selected, leads the user to another network-based entity. When the user clicks the link and lands at the second entity, the second entity intercepts the identifier. The second entity then uses the identifier to request from the first entity all of the details collected by the first entity about the user's interactions.

The technology is illustrated using a method for chat, SMS, and leads tracking and management, including a system and method for bringing SMS into an online context, enabling the association of SMS with online data. This can be accomplished by tracking SMS in a similar manner to on-website events, such as chat requests. The terms "leads" and "prospects" generally refer to prospective customers herein. Methods and systems described herein can facilitate tracking, recording, and associating data about the online, SMS, and offline activities of leads or prospective customers. Advantageously, the methods described herein can utilize a single telephone number, which can be an existing telephone number belonging to a business, maintained by a business, or maintained for a business.

In some embodiments, the method involves the following actions:
 a. Placing "Text" buttons or links on a website of a business (hereinafter simply "business");
 b. when a visitor ("User") clicks the "Text" button or link on the website, a request is sent to a remote database of a tracking entity ("Tracker");
 c. the Tracker creates a new record in its database and generates an identifier (ID);
 d. the Tracker sends, or instructs the visitor's browser to send, a tracking request labeled with the new record ID to the website's analytics system;
 e. optionally, based on the new record ID, the Tracker generates a temporary shorter ID as a proxy to the original ID, and appends it to a new SMS;
 f. user types a message, using the SMS template created by the Tracker;
 g. when the SMS is sent, the Tracker parses the message body, identifies the code, optionally uses it to retrieve the record ID, and attributes the message to the record ID; and
 h. the website's analytics system is queried for visit details associated with the record ID.

The specific details, which involve repeated communications between a user's browser, website analytics system, and leads database, are more fully described below.

Various systems for tracking chats, text messages, and/or leads are disclosed herein. The system may include one or more non-transitory computer readable storage mediums storing instructions that, when executed by a computing system, cause the computing system to perform a method to track activity by associating interactions across network-based entities. A method executed by the computing system may include the steps discussed with respect to any or all of the above-described methods of tracking chats, text messages, and other interactions.

In accordance with one embodiment of the present invention, the invention consists of a tracking system comprising:
 establishing a group of computers including a first computer system, a second computer system, a third computer system, and a fourth computer system, wherein each computer within the group of computers is capable of exchanging data with at least one other computer within the group of computers;
 generating a base level identifier to identify at least one of a user, a visitor, and an event, wherein the at least one of the user and the visitor is associated with the event, wherein the step of generating the base level identifier is accomplished by the first computer system;
 processing an event on the second computer system, wherein the second computer system is in communication with the first computer system;
 establishing an event reference using the second computer system, wherein the event reference is associated with the event;
 appending the base level identifier to the event reference in the second computer system;

receiving data entered in association with the event using the second computer system to complete the event;

creating a record comprising the entered data and the base level identifier associated with the completed event in the third computer system;

appending information to the record using the fourth computer system, wherein the information is collected from sources other than the second computing system; and using the base level identifier to communicate the entered data associated with the completed event from the third computer system to the first computer system.

In a second aspect, the event is at least one of the following:
(a) an audio call,
(b) a text message,
(c) a chat message,
(d) a form submission, or
(e) an action associated with a website session.

In accordance with a variant of the present invention, the invention consists of a tracking system comprising:

establishing a group of computers including a first computer system, a second computer system, a third computer system, and a fourth computer system, wherein each computer within the group of computers is capable of exchanging data with at least one other computer within the group of computers;

generating a user level identifier to identify one of a user or a visitor, wherein the step of generating the user level identifier is accomplished by the first computer system;

presenting a web page on the second computer system, wherein the second system is in communication with the first computer system, the web page comprising a link to initiate at least one of a text message and a chat message;

appending the user level identifier to the at least one of the text message and the chat message initiation link in the second computer system;

receiving data introduced into the at least one of the text message and the chat message using the second computer system to complete the at least one of the text message and the chat message;

creating a record comprising the entered data and the respective user level identifier associated with the completed at least one of the text message and the chat message in the third computer system;

appending information to the record using the fourth computer system, wherein the information is collected from sources other than a website hosting the at least one of the text message and the chat message initiation link; and using the user level identifier to communicate the entered data associated with the completed at least one of the text message and the chat message from the third computer system to the first computer system.

In another aspect, the at least one of the plurality of computers is characterized by at least one of the following:
wherein the first computer system is characterized as a data management company,
wherein the second computer system is characterized as a user's computer system,
wherein the third computer system is characterized as an inquiry management system,
wherein the fourth computer system is characterized as an agent computer system having an agent entering data thereto.

In another aspect, the at least one of the plurality of computers is characterized by at least one of the following:
wherein the group of computers includes a plurality of first computer systems;
wherein the group of computers includes a plurality of third computer systems, the same at least one of the text message and the chat message being communicated to at least two of the plurality of third computer systems;
wherein the group of computers includes a plurality of fourth computer systems, each of the plurality of fourth computer systems acquiring information by at least one of:
 (a) different agents, wherein each agent of the different agents manually entering information into a respective fourth computer system of the plurality of fourth computer systems;
 (b) automatically, wherein at least one of the fourth computer system of the fourth computer systems automatically acquires the information; and
 (c) automatically, wherein at least one of the fourth computer system of the fourth computer systems automatically receives the information.

In yet another aspect, the at least one of the plurality of computers is characterized by at least one of the following:
wherein the first computer system is selected from a group of first computers, the group comprising:
 (a) an advertising platform,
 (b) a data management platform,
 (c) a publishing service,
 (d) a content management system,
 (e) a content optimization service, or
 (f) a generic computer system that issues user-level identifiers;
wherein the second computer system is characterized as a user's computer system;
wherein the third computer system is selected from a group of third computers, the group comprising:
 (a) a customer relationship management system,
 (b) an email marketing system,
 (c) a marketing automation system,
 (d) a text messaging management system,
 (e) a chat messaging management system, and
 (f) a generic system used to track and record information about incoming inquiries and ensuing activity;
wherein the fourth computer system is selected from a group of fourth computers, the group comprising:
 (a) a computer or mobile device having information entered manually by an agent,
 (b) a computer or mobile device having information entered automatically, and
a computer or mobile device receiving information automatically.

In yet another aspect, the method further comprises steps of:
defining the record comprising the entered data and the respective user level identifier associated with the completed at least one of the text message and the chat message in the third computer system as an original record;
creating a subsequent record based upon the original record;
associating the created subsequent record with the originally generated record; and
using the user level identifier to communicate the entered data associated with the subsequent record from the third computer system to the first computer system.

In yet another aspect, the first computer system comprises a plurality of first computer systems, the method further comprises steps of:
  referencing the user level identifier as a first user level identifier;
  generating at least one second user level identifier to identify a same one of the user or the visitor, wherein the step of generating the at least one second user level identifier is accomplished by any of the first computer systems of the plurality of first computer systems; and
  appending each of the at least one second user level identifier to the at least one of the text message and the chat message.

In yet another aspect, the step of appending the user level identifier to the at least one of the text message and the chat message is accomplished by appending the user level identifier as one of:
  (a) a prefix of a data string generated from the at least one of the text message and the chat message;
  (b) an intermediary segment of a data string generated from the at least one of the text message and the chat message; or
  (c) a suffix of a data string generated from the at least one of the text message and the chat message.

In yet another aspect, the method further comprises steps of:
  locating the user level identifier associated with the tracking identifier; and
  using the user level identifier to communicate the retrieved data to the first computer system.

In accordance with a first variant of the present invention, the invention consists of a tracking system comprising:
  establishing a group of computers including a first computer system, a second computer system, a third computer system, a fourth computer system, and a fifth computer system, wherein each computer within the group of computers is capable of exchanging data with at least one other computer within the group of computers;
  generating a user level identifier to identify one of a user or a visitor, wherein the step of generating the user level identifier is accomplished by the first computer system;
  communicating the user level identifier from the first computer system to the fifth computer system;
  generating a tracking identifier, wherein the tracking identifier is generated by the fifth computer system;
  defining and managing an association between the tracking identifier and the user level identifier;
  presenting a web page on the second computer system, wherein the second system is in communication with the first computer system, the web page comprising a link to initiate a at least one of a text message and a chat message;
  appending the tracking identifier to the event file identifier in the second computer system;
  receiving data entered into the at least one of the text message and the chat message initiation link using the second computer system to complete the at least one of the text message and the chat message;
  creating a record comprising the entered data and the respective tracking identifier associated with the completed at least one of the text message and the chat message in the third computer system;
  appending information to the record using the fourth computer system, wherein the information is collected from sources other than a website hosting the text message initiation link;
  using the tracking identifier to retrieve the entered data associated with the completed text message from the third computer system;
  locating the user level identifier associated with the tracking identifier; and
  using the user level identifier to communicate the retrieved data to the first computer system.

In accordance with a second variant of the present invention, the invention consists of a tracking system comprising:
  defining the record comprising the entered data and the respective tracking identifier associated with the completed text message in the third computer system as an original record;
  creating a subsequent record based upon the original record;
  associating the created subsequent record with the originally generated record; and
  using the user level identifier to communicate the entered data associated with the subsequent record from the third computer system to the first computer system.

These and other aspects, features, and advantages of the present invention will become more readily apparent from the attached drawings and the detailed description of the preferred embodiments, which follow.

BRIEF DESCRIPTION OF THE DRAWINGS

Various embodiments of the invention will hereinafter be described in conjunction with the appended drawings provided to illustrate and not to limit the invention, in which:

FIG. 18 presents an exemplary flowchart illustrating a method utilizing a unique URL at a tracking company's website to send an e-mail from the tracking company's e-mail address to the business, wherein the email includes a unique record identification code; and FIG. 19 presents an exemplary high-level schematic diagram of a computer system representative of any of the various computing devices described herein.

DETAILED DESCRIPTION OF THE PRESENT INVENTION

Figure 1:
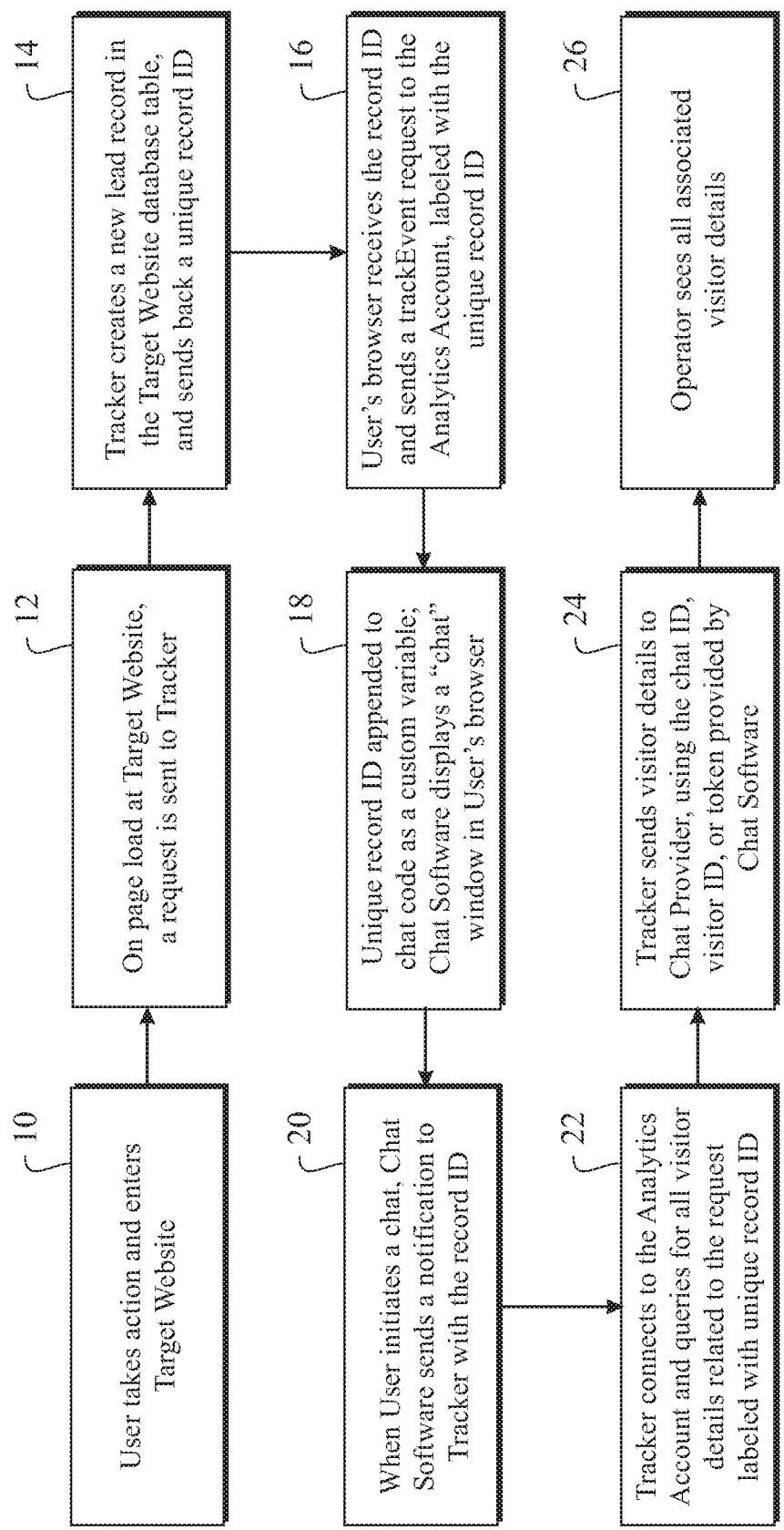
FIG. 1 presents an exemplary flowchart illustrating a method for tracking a chat session through the browser.

The following description with reference to the accompanying drawings is provided to assist in a comprehensive understanding of the exemplary embodiments. It includes various specific details to assist in that understanding but these are to be regarded as merely exemplary. The terms and words used in the following description and claims are not limited to bibliographical meanings or any extrinsic dictionary definition, but are merely used by the inventor to enable a clear and consistent understanding of the disclosure. The terms used herein must be understood based on the descriptions made herein, and are defined herein according to the functions of the present disclosure. Those of ordinary skill in the art will recognize that various changes and modifications of the embodiments described herein can be made without departing from the scope and spirit of the disclosure. Descriptions of well-known functions and constructions may be omitted for clarity and conciseness.

The following terms are used throughout this description with the following meanings:

A "Business" refers to a person, establishment or other entity that advertises to attract leads.

A "Target Website" refers to a website that a Business maintains on one or more server computers. A Target Website may display a telephone number such that a visitor to the Target Website can send a text message to Business via the telephone number displayed on the Target Website.

A "user" refers to a person who visits the Target Website or accesses any other network-based content (for example, a marketing property) of Business.

A "Tracker" refers to at least one of an entity and a service, wherein the Tracker is typically external to a Business. The Tracker tracks and associates data related to user activity from accessing network-based content of Business. In general, the Tracker can adapt to any external system or service that the Target Website selects, provided that such system has a public-facing Application Programming Interface ("API") that allows for remote calls for retrieval, additions, recording, and/or alterations of data. In some embodiments the Tracker can also (or instead) associate data collected after a User's interaction with Business (for example, data relating to a purchase following a text message conversation) with data related to the User having accessed network-based content of a Business (for example, a website). The Tracker can communicate with other systems (for example, Communications Provider, Capable Entity, Lead Manager, Chat Software, Analytics Account, Advertising Account, Foreign Domain, and the like) by way of HTTP POST requests, HTTP GET requests, and the like or a combination thereof.

A "Lead Manager" is one example of an external service referred to above, e.g., a leads management system. Examples of suitable leads management systems can include those provided by FUTURE SIMPLE, SALESFORCE, and the like. A similar example is a message management dashboard utilized by a support center, such as CONTACTATONCE.

A "Chat Software" is another example of an external service referred to above, e.g., a provider of software that allows web visitors to communicate with Business via a chat window presented on the Target Website. Examples of such software programs can include those provided by LIVECHAT, LIVEPERSON, and the like.

A "Communications Provider" refers to a communications service that enables forwarding incoming text messages to pages of code. Possible examples of a Communications Provider include TWILIO, PLIVO and BANDWIDTH.

A "Tracking Number" is a number that Business can maintain at Communications Provider. A Tracking Number can be a general number for online inquiries, and can be configured to generically forward text messages if no code is identified. Alternatively, the Target Website can maintain a telephone number outside of Communications Provider, and can have all text messages forwarded to a designated Tracking Number at Communications Provider.

An "Analytics Account" is an account of an analytics tool/system of Business, which is another example of an external service referred to above; and an example of such an analytics tool/system is GOOGLE ANALYTICS.

An "Advertising Account" is an account with an online advertising platform, which is another example of an external service referred to above; and an example of such an online advertising platform is GOOGLE ADWORDS. The advertising platform can be, for example, any advertising platform that can accept remote requests and/or imported conversions in the form of file uploads, for example. The advertising platform can also refer to a media-buying platform that incorporates information about a User's activity into its algorithms.

A "Tracking Cookie" is a cookie that can be used to track online activity. A Tracking Cookie can be associated with an analytics tool, such as that provided by GOOGLE ANALYTICS or the like, where the cookie can be the _utma or _utmb cookie utilized by GOOGLE ANALYTICS. The _utma cookie values are used to distinguish users and sessions and are created when a JAVASCRIPT library executes and no existing _utma cookies exist. The _utma cookie is updated every time data is sent to GOOGLE ANALYTICS. The _utmb cookie values are used to determine new sessions/visits and are created when the JAVASCRIPT library executes and no existing _utmb cookies exist. The _utmb cookie is updated every time data is sent to GOOGLE ANALYTICS. Alternatively, a Tracking Cookie can be associated with an advertising platform, such as that provided by GOOGLE ADWORDS or the like, where the cookie would be the globally unique tracking parameter or GOOGLE Click Identifier ("gclid") utilized by GOOGLE ADWORDS. A Tracking Cookie can have a Tracking Cookie value that can be used to distinguish among Users and sessions. Such cookies can be created when at least one of (a) the JAVASCRIPT library executes and (b) when no existing tracking cookies exist.

Note that, although the methods introduced here are described as using GOOGLE ANALYTICS, any other cookie-based analytics system that uses unique values to identify the Users and visits and that can be queried for visitor details associated with a label could be substituted. The methods can also be modified to accommodate an analytics system that does not utilize cookies and instead relies on user-specific profile IDs or a similar unique variable to identify a user, provided that the profile ID can be retrieved and queried remotely and that subsequent information associated with the profile ID can be recorded remotely.

A "Remote Tracking Request" refers to a request sent from a server to the Analytics Account using the Tracking Cookie value.

An "Operator" is an employee or agent of a Business, whether real or virtual, handling lead management on behalf of the Business.

A "Foreign Domain" is an online property, other than the Target Website, where Business can display a telephone number, such as a classified ads website (e.g. Craigslist).

An "Element ID" is an identifying attribute of a text-prompting button, link, or other HTML element.

A "Capable Entity" is Business with a system capable of collecting incoming text messages and communicating the information to an external system via the Internet. Such a system can be managed internally by Business or outsourced to a provider of such systems. Note that certain Communications Providers can also qualify as Capable Entity.

In the exemplary flow diagram illustrated in FIG. 1, the User can execute an action at step 10 that takes the User to the Target Website, such as clicking on an ad, clicking on a search link, or clicking on a referring link, etc. Next a request can be sent to the Tracker once the Target Website has loaded at step 12. The request can be sent from the User's browser to the Tracker, using a JAVASCRIPT snippet that Business adds to a Target Website's code. The JAVASCRIPT can reference code on the Target Website or the Tracker. Alternatively, the Target Website can make a server-side request to the Tracker as soon as the User's browser sends a request to load pages from the Target Website, before the Target Website has actually loaded at the User's browser.

At step 14, the Tracker can create a new lead record in the Target Website's leads database table and can send back a record identification code to the User's browser. The record identification code (or record ID) mentioned herein assists the Tracker in uniquely identifying the record in its database. The User's browser can receive the record identification code at step 16 and can send a request to the Analytics Account. If the Analytics Account used were GOOGLE ANALYTICS, the request can be a trackEvent request labeled with the record identification code. The User's browser can then send a request to append the record identification code to Chat Software at step 18. At step 20, Chat Software can notify the Tracker that the User activates a chat window. Note that depending on Chat Software, certain software includes this step while other software excludes this step, and the method can simply skip to the next step instead. The Tracker can then connect to the Analytics Account and query for all visitor details associated with the request labeled with the record identification code at step 22. Using the chat ID, visitor ID, or token provided by Chat Software, the Tracker can communicate this information to Chat Software at step 24. At step 26, the Operator can see all the visitor details next to the chat request in the Chat Software dashboard.

There are several alternatives to sending the request referenced in step 16. In one scenario, the Tracker can utilize an identifier that has already been created. For instance, the Tracker can collect a Tracking Cookie and use this value in lieu of generating the Tracker's record identification code.

Another possibility can involve submitting the tracking data together with the chat request at step 24. The code can populate the available data into a database of the Tracker or another system, such as Lead Manager. Note that in this alternative, data related to accessing network-based content is limited to the information available and collected at the time of the connection request (e.g., information specific to the connection request cannot be collected later). This can be remedied by collecting and submitting a Tracking Cookie with the connection request, and later using the Tracking Cookie to send a Remote Tracking Request that incorporates a record identification code, which would then permit retrieving information specific to the record at the external system via another remote request.

Yet another scenario can involve the Tracker establishing its own tracking data, which can be submitted together with the connection request at step 24. This data can be associated with an identifier generated by the Tracker, such as a Tracking Cookie, or a pre-specified identifier such as an IP address. If the data is associated with an identifier, the Tracker can elect to send only the identifier at step 24, and use that identifier to retrieve additional data later.

In any scenario where data is available prior to the connection request, the Tracker can utilize the data to route the connection request. For instance, the Tracker can decide to route a connection request associated with a visit from a web search to a certain destination (e.g., network locator), and a connection request associated with a visit from a banner ad to another destination (e.g., network locator). As a result, the chat request can be routed to a specific Operator, using the User's activity to optimize this process. If the Tracker elects to use the data to assign records to a specific Operator, the Tracker can follow rules pre-specified by Business.

Figure 2:
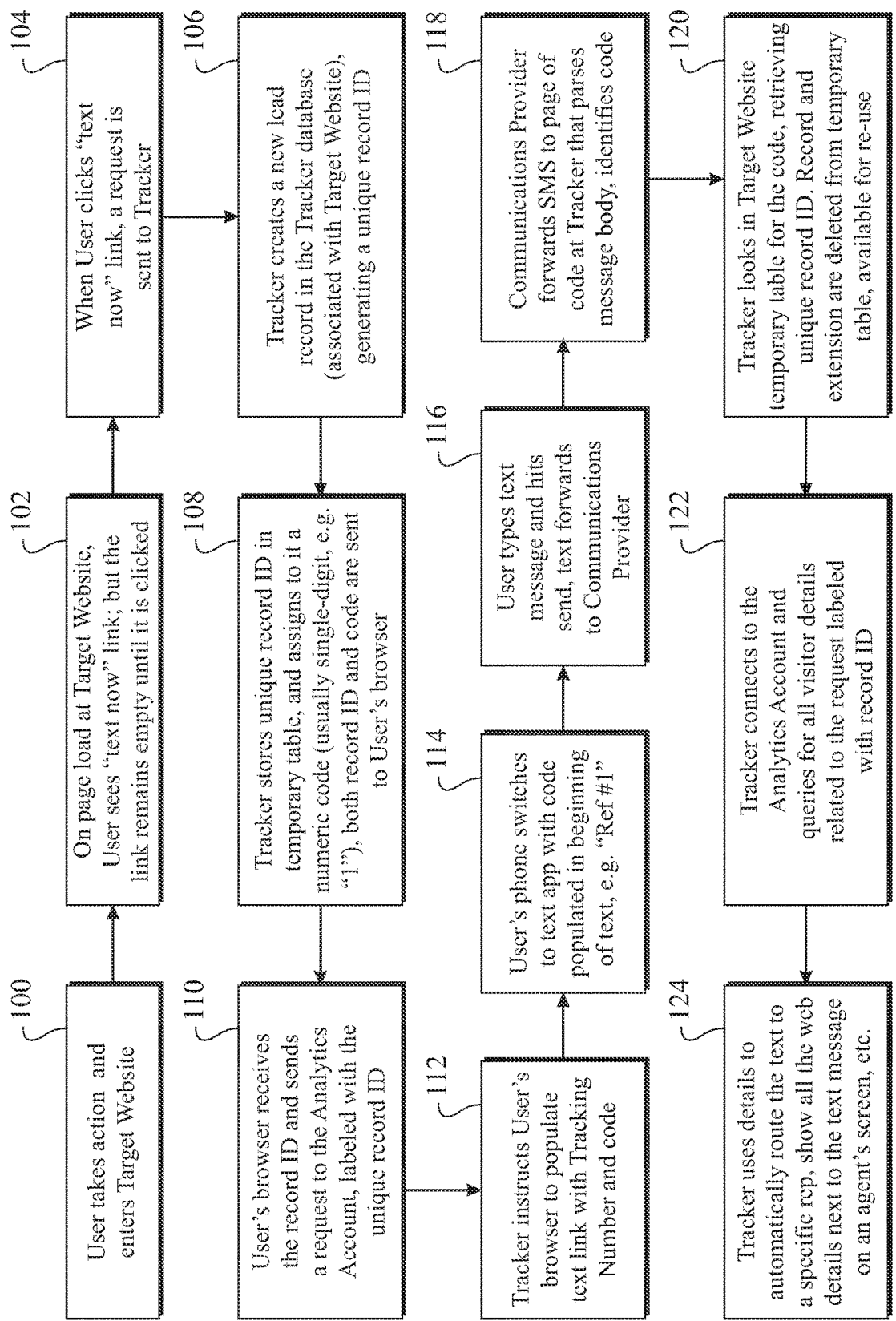
FIG. 2 presents an exemplary flowchart illustrating a method for tracking a text message conversation.

In another variant, the method can be applied to track SMS messages, following the flow chart illustrated in FIG. 2. The User can execute an action at step 100 that takes the User to the Target Website, such as clicking on an ad, clicking on a search link, or clicking on a referring link, etc. At step 102, upon entering website, the User can see an empty "text now" link. When the User clicks the link at step 104, a request can be sent to the Tracker. The request can be sent from the User's browser to the Tracker, using a JAVASCRIPT snippet that Business adds to the Target Website's code. The JAVASCRIPT can reference code on the Target Website or the Tracker. Alternatively, the Target Website can make a server-side request to the Tracker as soon as the User's browser sends a request to load pages from the Target Website, before the Target Website has actually loaded at the User's browser. Then, at step 106, the Tracker can create a new blank lead record, and can generate a record identification code associated with the lead record.

In step 108, the Tracker can store the record identification code in a temporary table and assigns to it a temporary proxy code, which can be a shorter, single-digit, such as "1." The record identification code, Tracking Number, and the proxy code can then be sent to the User's browser. The User's browser can receive the record identification code at step 110, and can send a request to the Analytics Account, such as a trackEvent request to GOOGLE ANALYTICS, labeled with the record identification code. Using JAVASCRIPT, the Tracker can then instruct the User's browser to populate the "text now" link with the Tracking Number and temporary code at step 112. In step 114, the User's phone can switch to the phone's native SMS application, or a default one used to handle text messages, and the temporary code can be inserted at the beginning of the message body. For instance, the message can be pre-populated with the words "Ref #1". The User can type the text message following the words and tap "Send" at step 116. At step 118, the text message can be sent to the Tracking Number, can be received by Communications Provider, and can be forwarded to a page of code (e.g., a page in a server-side programming language, for example, PHP) at the Tracker that can parse the message body, extracting the temporary code.

In step 120, the Tracker can search the Tracker's database for the temporary code, locate the record identification code, associate the text message with the record identification code, and delete the record identification code and the temporary code from the temporary table, making the temporary code available for re-use by the system. The Tracker can then associate the rest of the text message body (e.g., everything after the temporary code) with the record in step 122. At step 124, the Tracker can connect to the Analytics Account and query for all visitor details related to the request labeled with the record identification code. Finally, in step 126, the Tracker can utilize the information obtained from the Analytics Account to automatically route the text message to a specific Operator. In this process, the Tracker can follow preset rules defined by Business.

Figure 3:
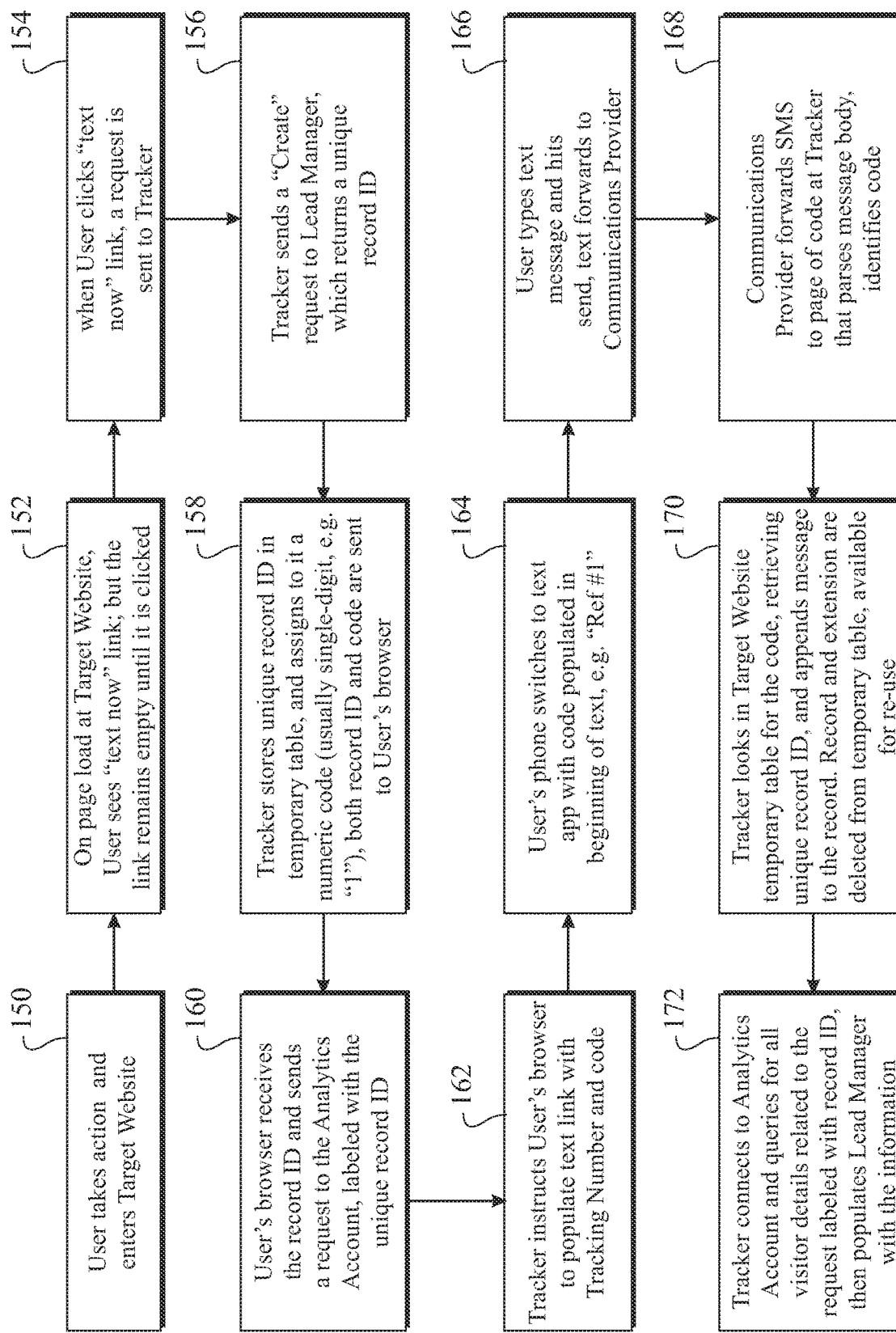
FIG. 3 presents an exemplary flowchart illustrating a method for tracking a text message conversation with an external leads management system.

In another variant, the method can be adapted to integrate with any Lead Manager, as shown in exemplary flow diagram illustrated in FIG. 3. Herein, the Tracker acts as an interpreter between Lead Manager, Communications Provider, and the Analytics Account. The Tracker can generate an ID or record identification code, send the code to both Lead Manager and Analytics Account, and forward the text message to Business. In the exemplary flow diagram of FIG. 3, steps 150-154 are similar to steps 100-104 described in FIG. 2. At step 156, the Tracker can send a "create" request to Lead Manager, such as SALESFORCE, which can return a record identification code. This record identification code can then be used in lieu of the Tracker's own record identification code. Alternatively, the Tracker can still generate the Tracker's own record identification code, and associate Lead Manager's record identification code with the Tracker's identification code. Steps 158-170 are similar to steps 108-120 in FIG. 2. In step 172, the Tracker can connect to the Analytics Account and retrieve all details associated with the request from step 160 (similar to step 122). In addition, the Tracker can populate the record at Lead Manager with the information obtained from the Analytics Account. For example, if the Lead Manager were SALESFORCE, the Tracker can populate the "Campaign" object in SALESFORCE.

Figure 4:
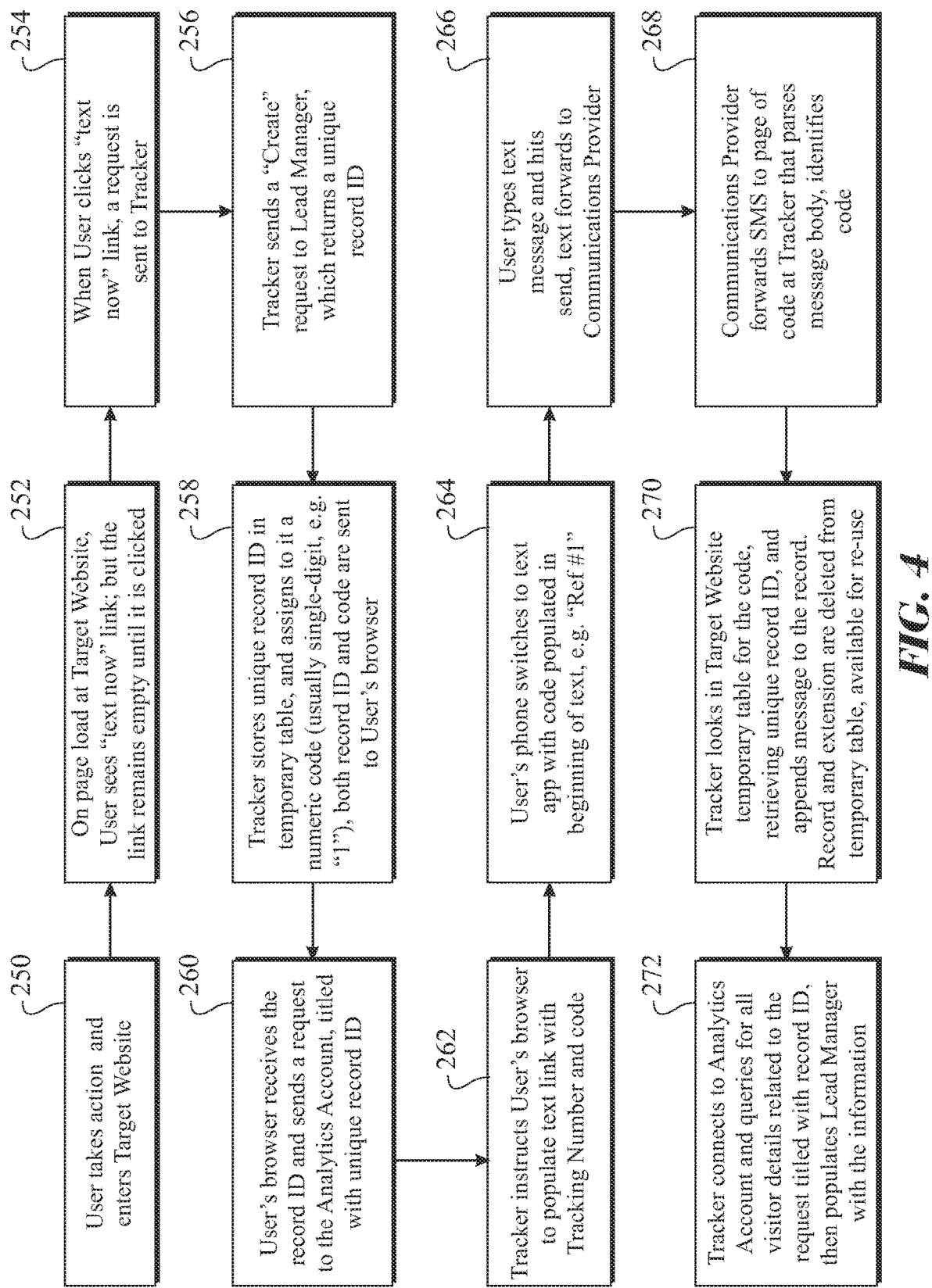
FIG. 4 presents an exemplary flowchart illustrating a method for tracking a text message conversation utilizing an external leads management system and an alternate web analytics system.

Another exemplary flow diagram describing the technology introduced herein is illustrated in FIG. 4. In the exemplary flow diagram illustrated in FIG. 4, the method is illustrated using an alternate analytics software. Instead of using GOOGLE ANALYTICS as described above in FIG. 3, the method can use SALESFORCE as the Lead Manager and CLICKY ANALYTICS as the Analytics Account. In the illustrated embodiment, steps 250-258 are similar to steps 150-158 in FIG. 3. At step 260, the Tracker can send a request to the Analytics Account labeled with the identification code, such as a log request titled with the identification code to CLICKY ANALYTICS. The remaining steps, 262-272, are similar to steps 162-172 in FIG. 3.

Figure 5:
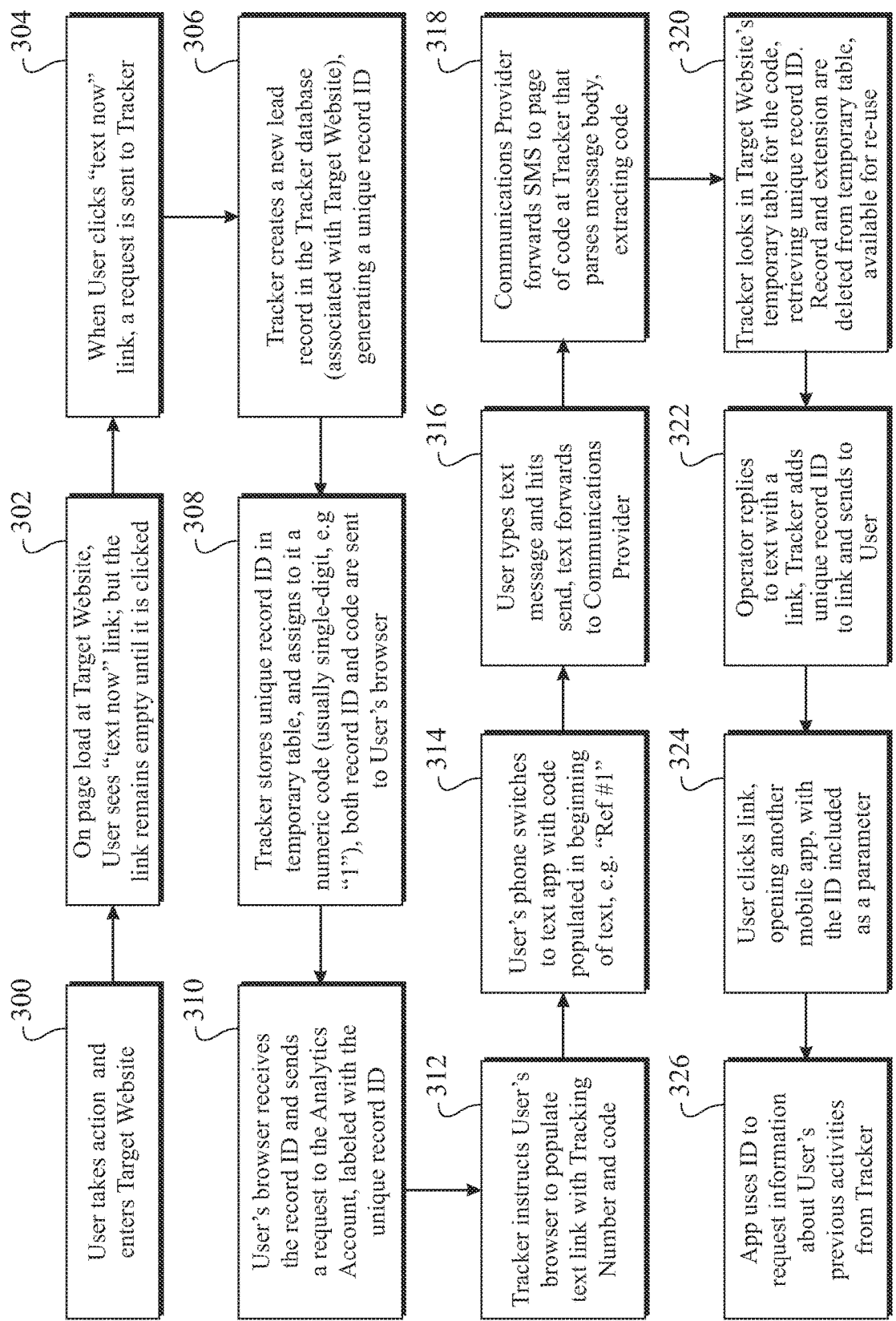
FIG. 5 presents an exemplary flowchart illustrating a method for tracking a text message conversation and associating the information with activity in other network-based entities.

Yet another exemplary flow diagram describing the technology introduced herein is illustrated in FIG. 5, more specifically, a system that tracks and associates activity across the SMS and mobile browser applications. In the exemplary flow diagram illustrated in FIG. 5, the method can be adapted to associate multiple user interactions across different entities where at least one of the interactions is anonymous. An entity can be any form of managed network-based content, such as a website or an application. An anonymous interaction refers to one where the User is not personally identified, for instance, by entering user-specific information such as an e-mail address. Note that the anonymity of an interaction can also be measured by its scope. Thus, a personally-identified interaction with one entity can be anonymous to another entity. For instance, the interaction of a logged-in User browsing products inside a clothing brand's mobile-device application is personally identified to the operator of the application. However, when the User clicks to call, e-mail, or send a text message to the brand's support team, the User's device will navigate to another application, such as the phone, e-mail, or SMS application of the device. From the perspective of any of the phone, e-mail, or SMS applications, as well as the brand's support system, the User's preceding interaction with the clothing brand's application is anonymous. Similarly, to the clothing brand's application operator, the User's interaction with the phone, e-mail, or SMS applications, as well as the brand's support system, is anonymous.

The exemplary flow diagram illustrated in FIG. 5 enables linking such two interactions by issuing a common identifier. In this embodiment, an entity (such as an application) can collect information about user interactions with the properties such entity operates, and can associate it with an identifier. The identifier can be issued by the entity or a third party. The entity can attach the identifier to any activity that leads the User outside of the entity-operated properties, for instance, by appending the identifier to the URLs of outgoing links as a query string parameter. When the User clicks the URL and is led to a second entity, the second entity can infer the identifier and use it to request from the first entity all of the information the first entity collected about the User. Further, the second entity can also embed the same identifier to continue tracking the User's activity across additional entities.

Steps 300-320, introduced in FIG. 5, are similar to steps 100-120 from FIG. 2. In step 322, the Operator can reply to the User, embedding in the message a link to open Business' mobile application. Note that the Operator can also communicate with the User through e-mail messages. The Tracker can append the record ID to the link, for instance, by appending it to as a query string parameter, and can forward the message to the User's phone. If the User's device is running the iOs operating system from APPLE, the link can be: trackedAppName://?identifier=User12345.

Note that the link can also be an HTML link that redirects to a device-specific link. This can be accomplished using the browser's "window:location" Javascript command. An HTML link can be minimized with a URL shortening service, creating a user-friendly link that can be inserted in text messages, which often have limited character length. For instance, the HTML link corresponding to the example native link given above can be, http://tracker.com/?app=trackedAppName&identifier=User12345. In step 324, the User clicks the link and the application opens on the User's phone. The entity operating the application infers the identifier and uses it to request from the Tracker details about the User's conversation with the Operator in step 326. Note that entity can also embed the identifier in outgoing URLs, thereby passing it forward to other entities. In addition, the entity can use the information obtained from the Tracker to record information about the source of the visit in entity's activity tracking system.

In yet another embodiment, the system can be modified to enable sophisticated remarketing efforts. Specifically, Business can create remarketing lists associated with pre-specified criteria within its Analytics Account, such as event categories in GOOGLE ANALYTICS. The Tracker can store the Tracking Cookie values associated with the visit that triggers a text message together with the new lead record, and can use those values to send a Remote Tracking Request to the Analytics Account at a later date, such as when the Operator marks a lead record as "Converted" in the Tracker's dashboard. Essentially, this allows Business to record information about leads, such as purchases, in a manner similar to e-commerce transactions, even if the actual sale occurs days, weeks or months later, and without any action taken by the lead. When the request registers, the lead's cookie information is automatically added to the pre-specified remarketing list, just as if the lead took a pre-specified action on the Target Website. Using a combination of such lists, Business can then segment for targeted advertising the customers that called but never converted. Examples of the method are outlined in FIG. 6 for text messages, and FIG. 7 for chat requests.

In both methods, the system can be modified to include remarketing tags, which enable adding visitors to lists that enable targeted marketing. For instance, events with different action categories can be added at different times throughout the interaction, e.g. when a text is initiated, a conversation has ended, etc. This adds the prospects to related lists, and enables targeting, for example, users who attempted but never sent a text message. Further, by storing a visitor's Tracking Cookie values, such as the _utma or _ga cookie values utilized by GOOGLE ANALYTICS, the system can also automatically add "Converted" events when the Operator tags lead records as such, which in the Analytics Account would be associated with the original visits that triggered an action. This would allow Business to segment for advertising visitors at different stages of the customer lifecycle and connect online behavior patterns to offline interactions. Note that although the methods are described using GOOGLE ANALYTICS and cookies, that the same methods can be implemented using any identifier that distinguishes users and/or sessions, on any device.

Figure 6:
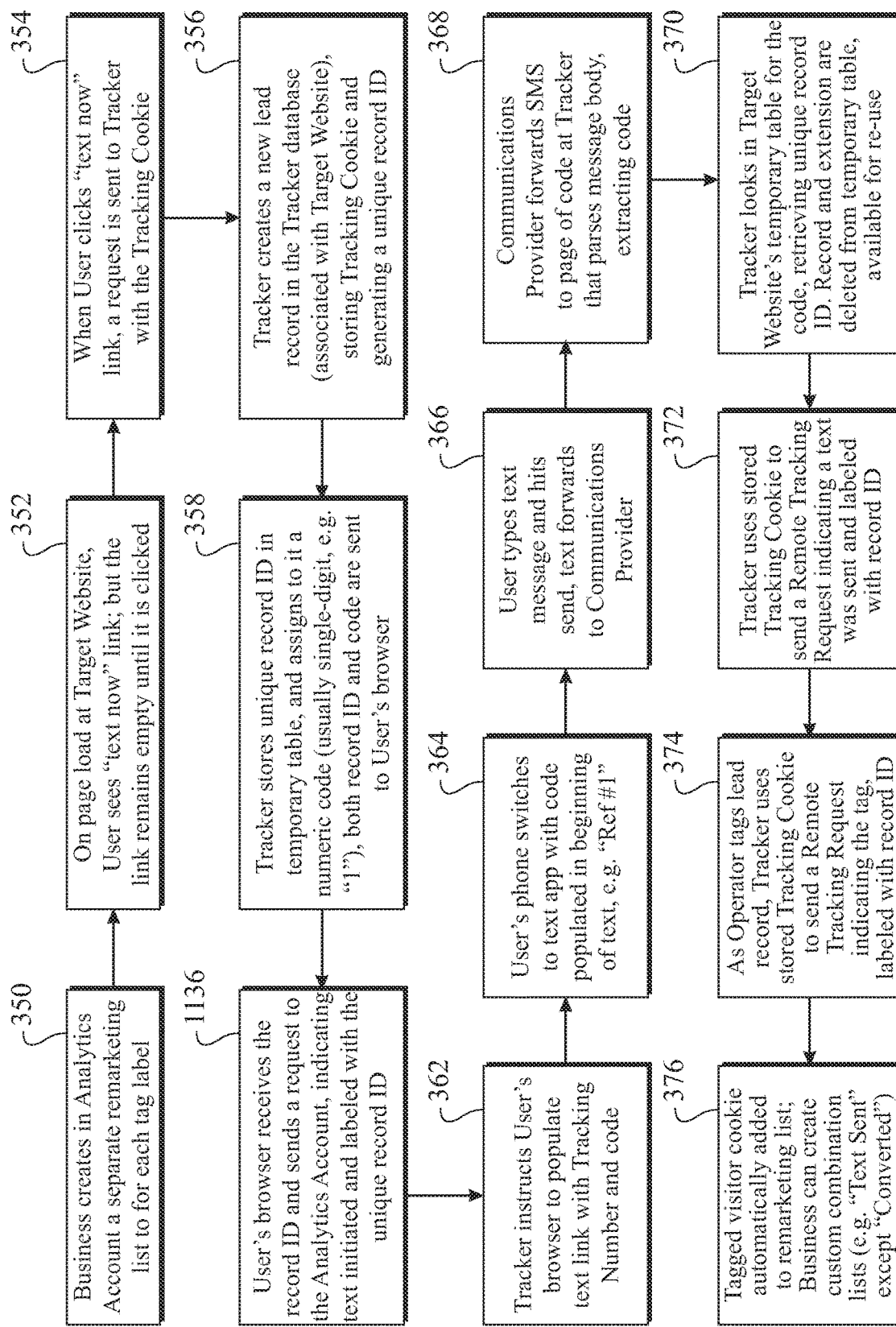
FIG. 6 presents an exemplary flowchart illustrating a method for tracking a text message conversation and enabling adjustment of follow-on advertising based on data collected during the text message conversation and thereafter.

An embodiment of this method is illustrated in FIG. 6. In step 350, Business can create in the Analytics Account a separate remarketing list for each request type, for example, a separate remarketing list for each event category in GOOGLE ANALYTICS. Steps 352-370 are similar to steps 152-170 in FIG. 3. At step 372, the Tracker can utilize the stored Tracking Cookie value to send a Remote Tracking Request to the Analytics Account, which can be labeled with the record identification code. For example, the Tracker can send a server-side trackEvent request to GOOGLE ANALYTICS, categorized "Text Sent" and labeled with the record identification code. Note that the request at step 360 can also alternatively occur as a server-side request, using the Tracking Cookie value stored in step 356. In step 374, when the Operator later tags the lead record "Converted" in the Tracker dashboard, the Tracker can use the stored Tracking Cookie to send another Remote Tracking Request, which can be labeled with the record identification code. For example, the Tracker can send a server-side trackEvent request to GOOGLE ANALYTICS, categorized "Converted" and labeled with the record identification code. As with each of the previous tracking requests, this can cause the visitor cookie to automatically be added to the associated remarketing list, at step 376, and using these lists, Business can then create new lists with custom combinations, e.g. "Text Sent" but not "Converted."

Figure 7:
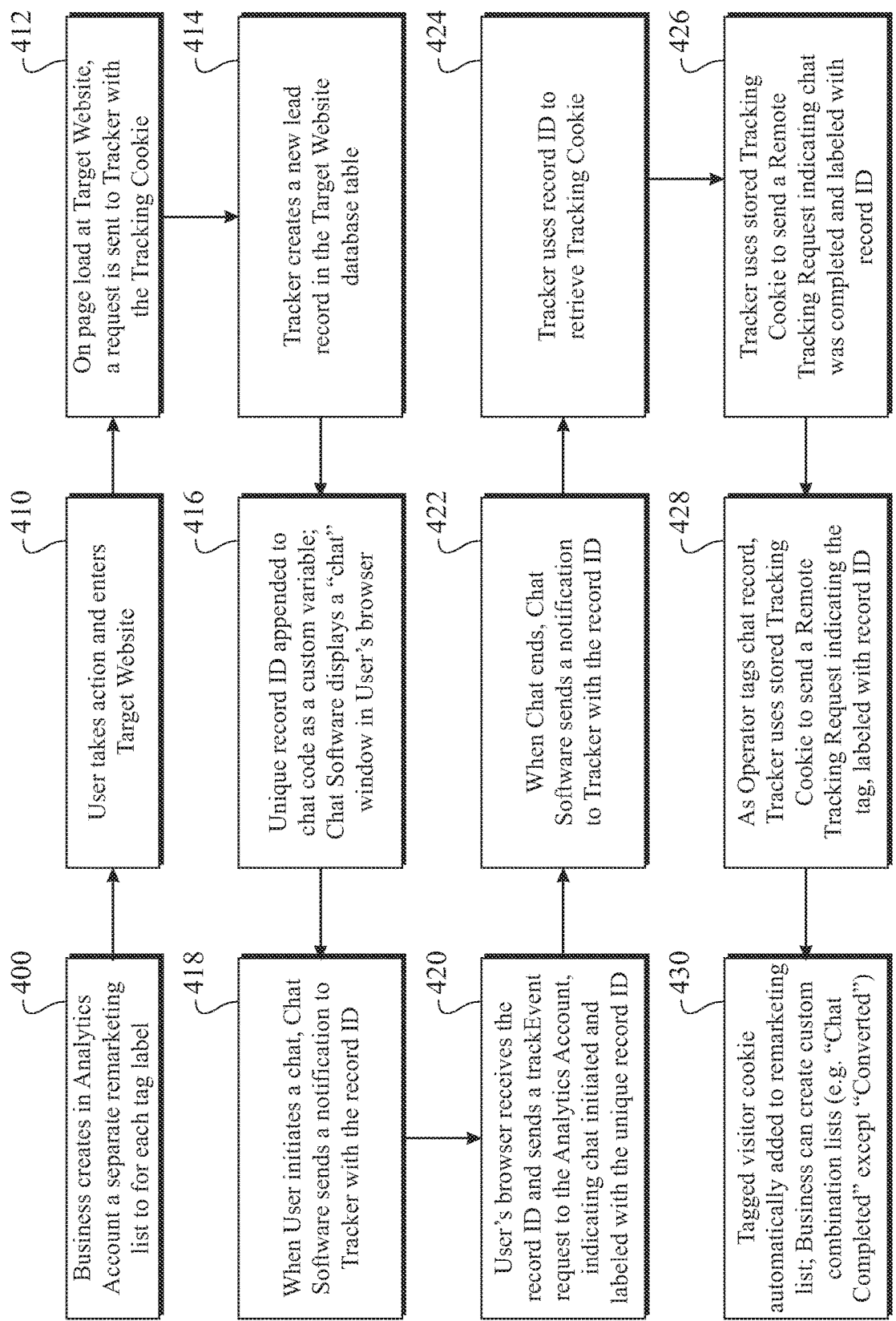
FIG. 7 presents an exemplary flowchart illustrating a method for tracking a chat conversation and enabling adjustment of follow-on advertising based on data collected during the chat and thereafter.

The remarketing method can also be adapted to the chat tracking methodology as illustrated in FIG. 1. An embodiment is illustrated in FIG. 7. Step 400 is similar to step 300 in FIG. 6. Steps 410-420 are similar to steps 10-20 from FIG. 1, with the initial request to the Analytics Account sent only when the User initiates a chat, as an alternative. Note that this request can also occur as a server-side request, similar to the request in step 360 from FIG. 6 outlined above. At step 422, when the chat ends, the Tracker can receive a notification from Chat Software with the record ID. The Tracker can use the record ID to locate the associated Tracking Cookie at step 424. At step 426, the Tracker can use the Tracking Cookie to send a Remote Tracking Request to the Analytics Account, which can be labeled with the record identification code. For example, the Tracker can send a server-side trackEvent request to GOOGLE ANALYTICS, categorized "Chat Completed" and labeled with the record identification code. Steps 428-430 are similar to steps 374-376 in FIG. 6.

The remarketing method can be adapted to work with any Lead Manager. This can be accomplished by creating a custom field for each lead record that stores the Tracking Cookie, along with a custom "Status" field that, when changed, will trigger the Tracker to send to the Analytics Account a Remote Tracking Request. Alternatively, the Tracker can query the external leads system in regular intervals (e.g., hourly or daily) and send a Remote Tracking Request for any updated or newly tagged records. Moreover, the method can be adapted to track information on attributes other than a lead's conversion status that Business could possess, such as indicated interests in a specific service category or demographic information.

Furthermore, the method can be adapted to other types of user lists that involve a recordable action taken on a website, such as newsletter signups. Thus, Business can choose to track and create specialized advertising for leads that sign up for a sports newsletter and indicate a specific interest in soccer, using lists from its e-mail marketing software, such as MAILCHIMP. The method can also be adapted to record offline actions taken by leads, such as a meeting with Business. In all of these cases, sending the data to any external account, such as an Analytics Account or an Advertising Account, can assist in adjusting follow-on advertising, personalizing an experience (including content), or simply facilitate Business' efforts in analyzing how online behavior correlates with offline activity.

The method can also be used for other purposes. For instance, when the User revisits the Target Website, the Target Website can collect the User's Tracking Cookie and send it to the Tracker. The Tracker would then search its database for a match, and communicate to the Target Website information about the User's previous activity, as well as any applied tags, sales, and other pertinent data. The Target Website can then utilize the information as needed, whether to adjust content, communicate activity to other systems, and the like.

Furthermore, the method can also be adapted to an automated scenario that does not require direct the Operator intervention in order to record information about leads. This would typically involve additional systems. For instance, using text recognition technology, the method can automatically detect a lead's expressed interest in a specific product or service, and create and send tags based on this information. Alternatively, using machine learning or other algorithms, the Tracker can automatically read information entered by the Operator in a lead record, and create and send tags based on this information.

The system can be further adapted to record chats and text messages as conversions in an Advertising Account by recording the corresponding Tracking Cookie, such as the globally unique tracking parameter or GOOGLE Click Identifier ("gclid") associated with GOOGLE ADWORDS. With GOOGLE ADWORDS, recording the gclid parameter enables the system to generate a MICROSOFT EXCEL, or similar spreadsheet software, file that can be imported as offline conversions into the GOOGLE ADWORDS account. Prior to generating the file, the Operator can manually delete within the system any records that do not qualify as conversions, such as promotional messages. One such embodiment is illustrated in FIG. 8.

Figure 8:
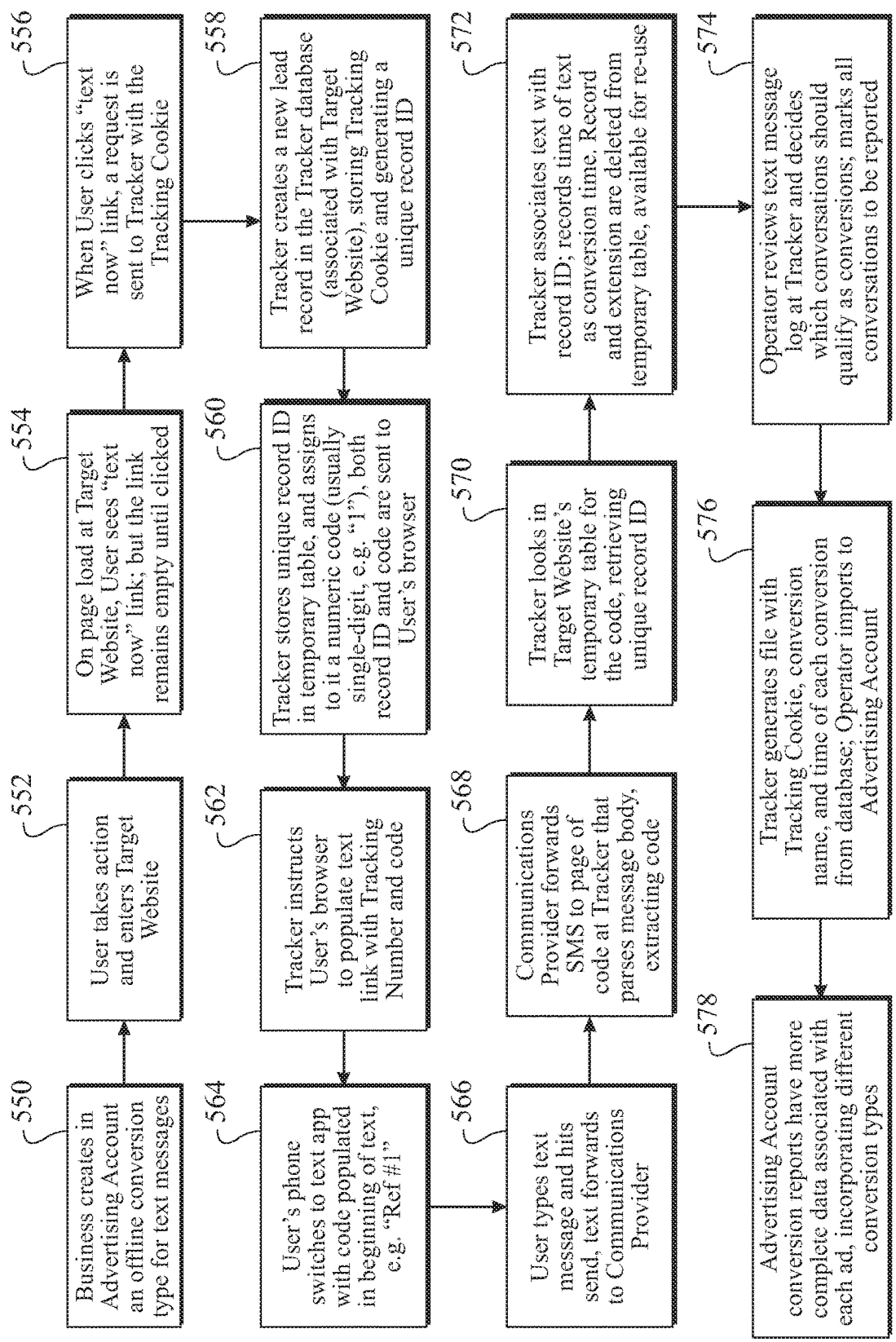
FIG. 8 presents an exemplary flowchart illustrating a method for tracking a text message conversation and importing of conversion data to a remote system, such as an advertising platform.

At step 550 in FIG. 8, Business can create in Advertising Account a conversion for text messages, such as an offline conversion type named "Text Message" in GOOGLE ADWORDS. Steps 552-572 are similar to steps 100-120 in FIG. 2, with the GCLID as the Tracking Cookie sent in step 556 and stored in step 558. At step 572, the Tracker can record the current time as the conversion time, in addition to associating the text message with the record ID and deleting the temporary code, making the code available for re-use. The Operator can review the text message log at step 574, decides which conversations should qualify as conversions, and mark all the conversations to be reported. At step 576, the Tracker can generate a file that can be imported into the Advertising Account. In the case of GOOGLE ADWORDS, this can be an EXCEL file with the gclid, conversion name (e.g., "Text Message") and time of each conversion from the database. The Operator can import the file into the Advertising Account. This methodology results in step 478, with Advertising Account conversion reports having more complete data associated with each ad, incorporating different conversion types, such as "offline conversions" in GOOGLE ADWORDS. A similar methodology can be applied to chat conversations, as well.

Further to the description of FIG. 8, when displaying the sources of visits associated with text messages and/or chats, the Tracker can aggregate identical ads to provide a more insightful performance report. Specifically, the Tracker can query the Advertising Account periodically, obtaining the ads' content and targeting metrics. These can be matched against the Tracker's existing information. Within the Tracker's database, IDs of multiple ads with identical content and targeting metrics can be given a single master ad ID, stored together with the ad content and targeting metrics. When the Tracker retrieves visitor source information from external systems, each text message or chat record can be associated with the master ad ID of the ad ID that was clicked (rather than the ad ID itself). A similar process is performed on the search queries entered by the User that triggered the ad impressions: the system can maintain a phrases table with an ID assigned to each phrase, and can attempt to match new search queries obtained from the analytics system against existing values. If a phrase matches an existing record, the phrase ID is associated with the record; otherwise, a new phrase record and ID can be created. In addition to reducing duplication, pairing this indexing of ads and keywords with User tags helps discover patterns, e.g. the ad-keyword combinations that generate the most revenue.

Figure 9:
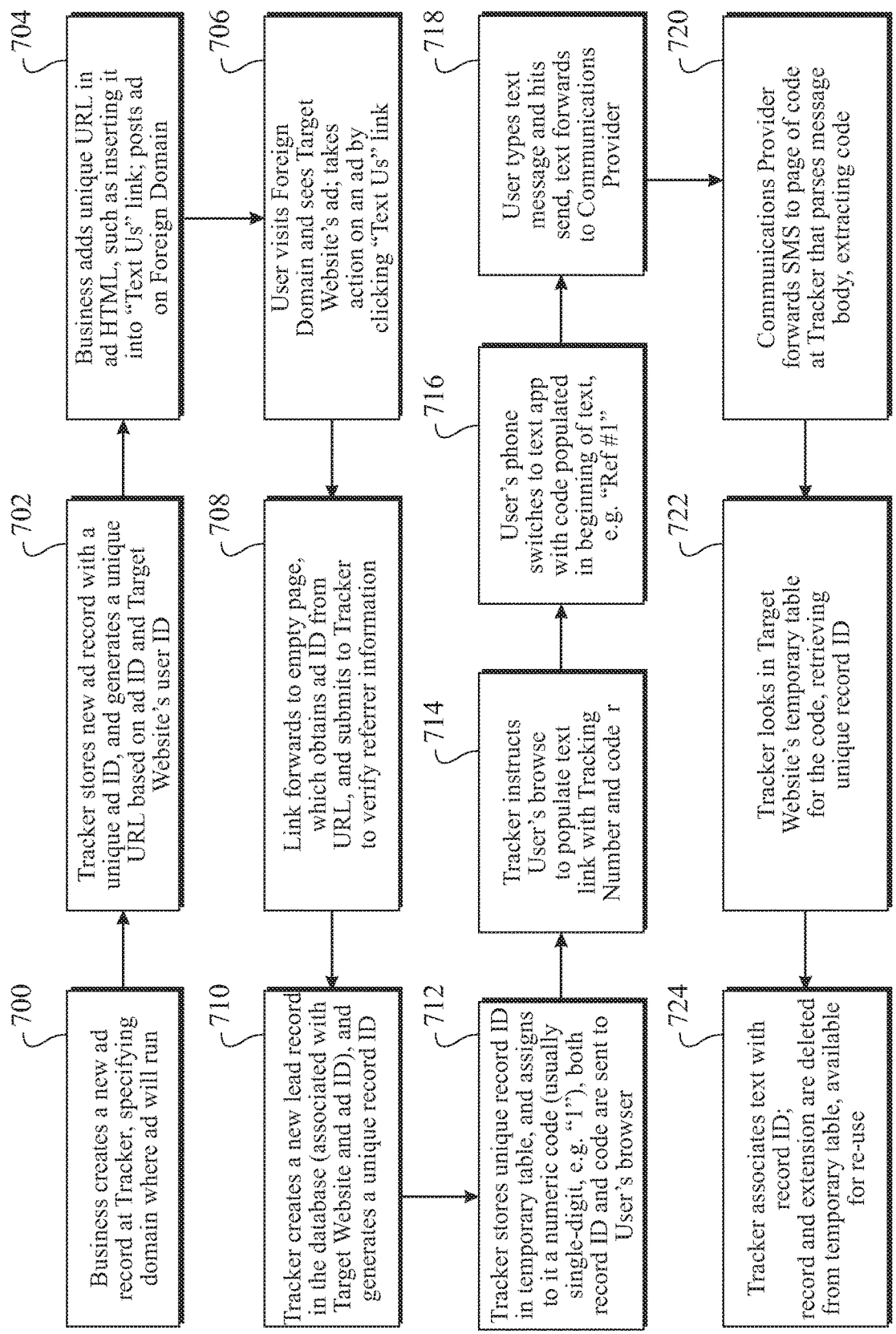
FIG. 9 presents an exemplary flowchart illustrating a method for tracking a text message conversation where a text message originates from network content other than a business' website.

Yet another embodiment enables tracking text messages that originate on Foreign Domain. An example of such an embodiment is illustrated in FIG. 9. This method is useful for analyzing activity from off-site marketing properties, by tracking text messages originating in clicks on an ad placed in Foreign Domain, such as classifieds websites Craigslist). Business can create a new ad record in a central database operated by the Tracker at step 700, specifying the domain name on which the ad will run, e.g. craigslistorg. The Tracker can store each ad at step 702, which has a record/ad ID with a corresponding URL, which points to a webpage. The URL is based on the ad ID and a Target Website's username. An example URL can be, www.tracker.com/offsite-tracking?username=TargetWebsite&adID=5. Business can add the URL to the ad HTML, such as inserting it into a "Text Us" link within the ad, and can post the ad on Foreign Domain, such as craigslist.org, at step 704.

The User can visit the third party website, see the ad, and Like action by clicking the "Text Us" link at step 706. The URL can verify that the referrer information matches the domain entered by Business, and once open, a JAVASCRIPT snippet can intercept the ad ID and the Target Website's username. The snippet can initiate a request with the ad ID and the Target. Website's username to the Tracker at step 708. At step 710, the Tracker can proceed to create a new lead record associated with the ad ID and the Target Website, and assign a record identification number, at step 710. The remaining steps, 712-724 are similar to steps 108-120 in FIG. 2. The Tracker can also initiate a Remote Tracking Request to the Analytics Account, indicating that a text message from Foreign Domain has occurred. Alternatively, Business can generate a QR code that points to the URL, and feature it on a print ad. When scanned with a mobile device, the User's browser can be automatically redirected to the URL, creating a "scan-to-text" functionality similar to the "click-to-text" outlined above.

Figure 10:
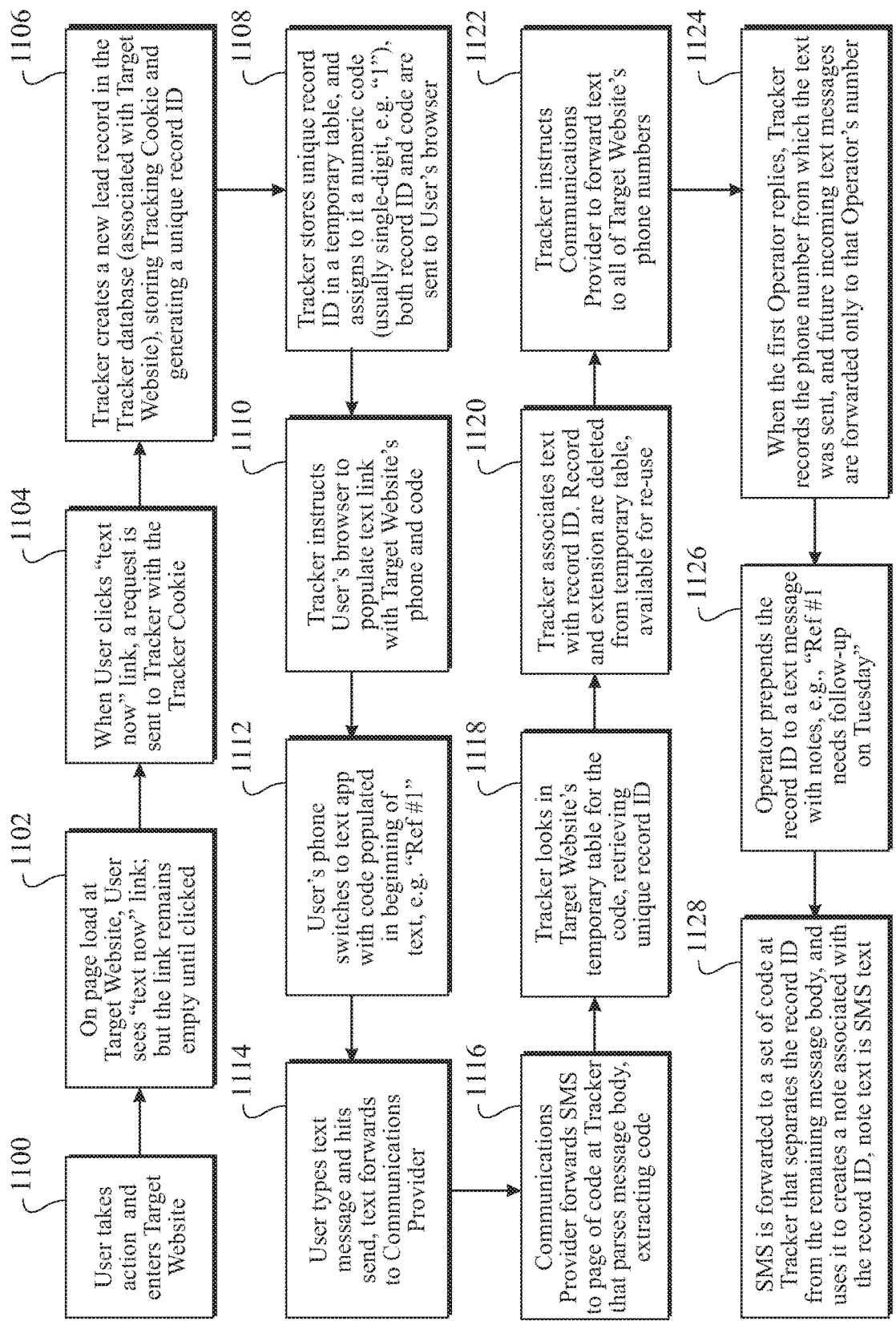
FIG. 10 presents an exemplary flowchart illustrating a for tracking a text message conversation with forwarding to multiple telephone numbers and using SMS as a way of appending notes about the conversation.

Another embodiment, as shown in FIG. 10, forwards the incoming text from the User to multiple Operators and connects the User with the first Operator that answers. This embodiment also allows the Operator to associate text messages with visitor data by communicating with the Tracker using SMS. Note that although these two features are described in a single embodiment, they are modularly independent. Steps 1100-1120 are similar to steps 100-120 in FIG. 2. At step 1122, the Tracker can instruct Communications Provider to forward the User's text to all of the telephone numbers of Operators associated with Business. At step 1124, when one of the Operators replies, the Tracker can record that Operator's number, and communicate all further incoming text messages from the User only to that Operator's telephone number. Further, at step 1126, the Operator can send the Tracker a text message with the record identification code and a few notes. For instance, the Operator can type, "Ref #1 needs follow-up on Tuesday." At step 1128, the Tracker can receive the text, use a method similar to step 1116 to parse the message body and collect the temporary code, identify the associated record identification code, and can then proceed to use the code to associate the remaining portion of the text message body with the text message conversation, which can be displayed as a note in the Tracker dashboard.

When generating the temporary code, the Tracker can insert designated Special Symbols (e.g., one or more symbols, characters, or digits). This would allow the Tracker to issue the same short temporary code to more than one party simultaneously, provided that in each additional simultaneous instance a Special Symbol, such as # or *, is appended to the code. For example, the Tracker can maintain temporary codes table for interactions on devices running the iOs operating system by APPLE and another temporary codes table for devices running the Anroid operating system by GOOGLE. To differentiate interactions, the Tracker can append or prepend a key to a generated code for iOs-device interactions, while Anroid-device interactions codes can be appended a different key, or no key (or vice versa). Thus, the Tracker can assign the code "1" to two distinct interactions simultaneously, in the form of "1" and "1#".

When analyzing the code, the Tracker can look for the Special Symbol, and can use the Special Symbol to determine the appropriate table to search for the temporary code. Alternatively, the Tracker can store all codes in a single table, utilizing one or more Special Symbols simply to enable use of otherwise identical temporary codes simultaneously. With the Special Symbols implemented, a temporary code of a certain number of digits can be used to track a larger number of simultaneous interactions, thereby improving scalability (e.g., a 3-digit code length without Special Symbols can track up to 999 simultaneous interactions; a 3-digit code with Special Symbols appended or prepended can track a multiple of this number).

Figure 11:
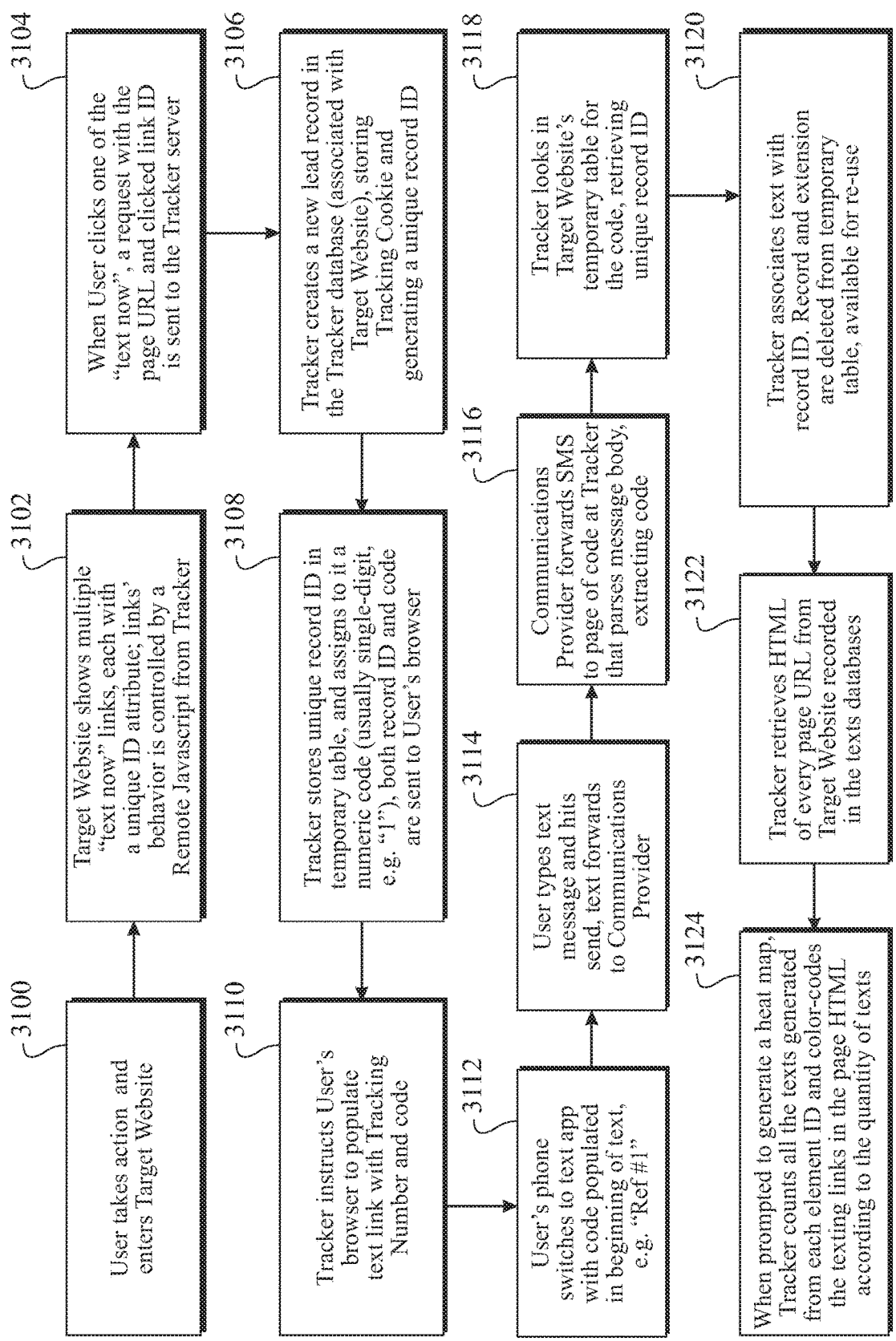
FIG. 11 presents an exemplary flowchart illustrating a method for tracking a text message conversation with data about text-prompting elements being collected and processed into visual reports.

In yet another embodiment of the technology, collected data can be aggregated into visual analytics reports. As shown in FIG. 11, in step 3100, the User can take an action that takes the User to the Target Website. For example, the User can click on an ad, a search link, or on a referring link, etc. to direct the User to the Target Website. Several "text" links, buttons, or a combination thereof can be loaded on the page at the Target Website at step 3102. Each such "text" button or link element can have an Element ID, for instance, by altering the ID attribute of the <a> HTML link tag. This Element ID attribute can be defined in the HTML or attached dynamically through JAVASCRIPT code. When the User clicks any of the elements at step 3104, a JAVASCRIPT can execute, collecting the clicked link or button Element ID as well as the current page URL and sending it to the Tracker. The Tracker can create a new blank record in its database, associated with the Target Website, populate it with the Element ID and page URL, and can generate a record ID at step 3106. Steps 3108-3120 are similar to steps 108-120 in FIG. 2.

In step 3122, the Tracker retrieves the HTML code of each page URL that is associated with at least one record in its database. This can be achieved by querying the records for unique values of page URLs, provided that these have been standardized (e.g., cleaned of prefixes such as http, https, or www, as well as webpage file extensions, GET variables, and the like). To retrieve the HTML code, the Tracker can initiate a cURL request to the appropriate URL at the Target Website. As described in step 3124, the Tracker can use the HTML code retrieved in step 3122 to display a simulated version of the webpage, with an overlay visualizing the click popularity of each "text" element. This would be calculated by summing the number of text message or chat records associated with each Element ID over a specified time period. the Tracker can then utilize a color scale to visually indicate the popularity of each Element ID in triggering interactions. For instance, the scale can vary from red to blue, with the most frequently clicked elements colored in red, and the least frequently clicked elements colored in blue.

Figure 12:
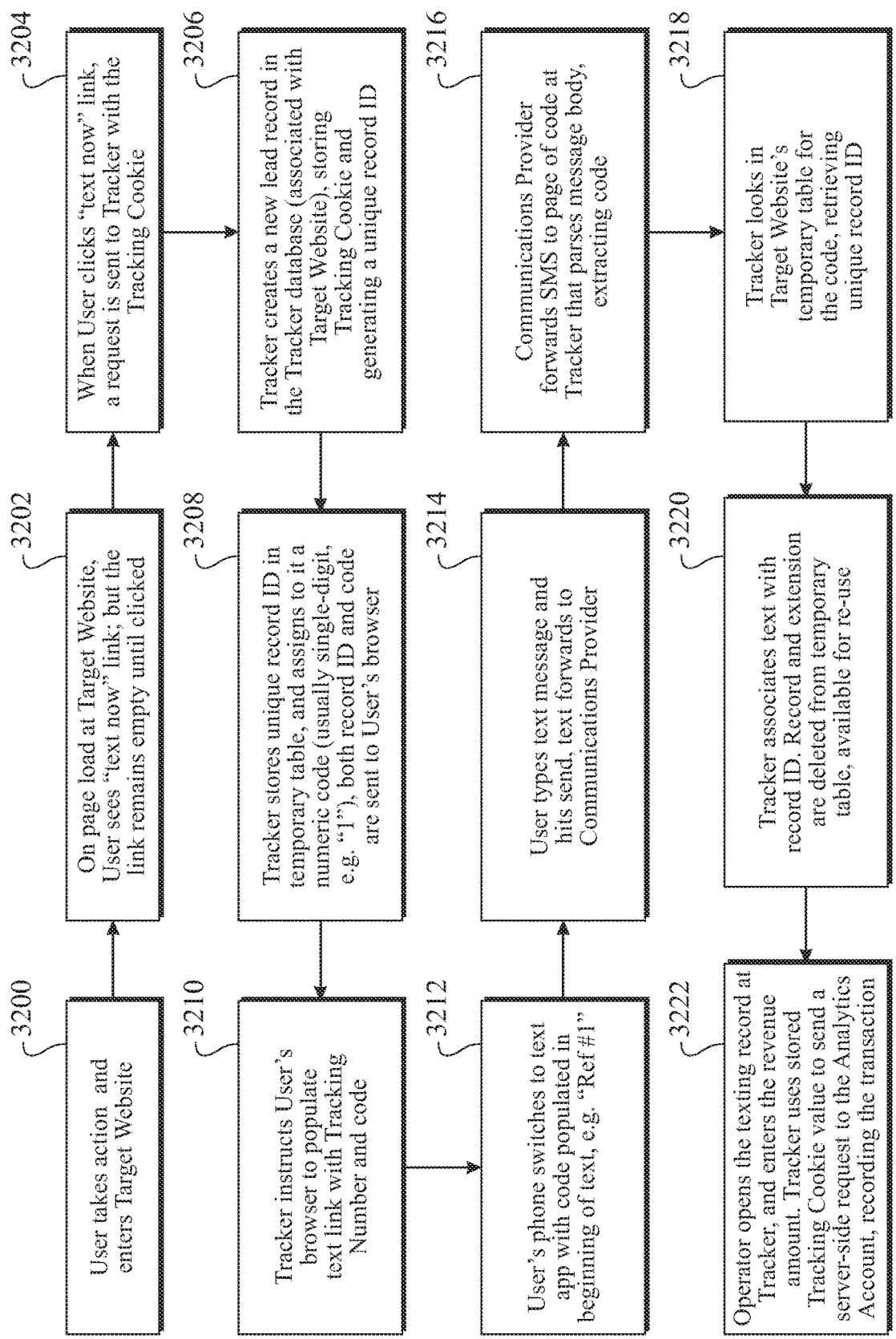
FIG. 12 presents an exemplary flowchart illustrating a method for tracking a text message conversation with recording data about financial transactions occurring during and/or after the conversation.

Another embodiment, shown in FIG. 12, allows the Operator to associate financial transactions resulting from text messages or chats with visitor information. This is accomplished by entering information in a system that interprets the data into a format suitable for sending to a website analytics system, where such data is associated with the visitor information. Steps 3200-3220 are similar to steps 100-120 in FIG. 2. During the text message and chat conversation, or following, the system can display the record to the Operator in a UI. The Operator can use the UI to enter information obtained during the conversation, for instance, the amount of sale revenue generated. Alternatively, the Operator can return to the record at a later date to enter a sale amount, when such a transaction actually closed. To locate the correct record, the Operator can read to the original text message conversation, refer to information automatically entered by the Tracker (such as the lead's telephone number), or consult information entered by the Operator during the original conversation or at a later date, such as the User's name and any relevant notes.

When the Operator enters the sale revenue, the Tracker can use the Tracking Cookie value to send a Remote Tracking Request associating a transaction with the original visitor data that triggered the text message or chat request. The Remote Tracking Request can incorporate the sale revenue entered by the Operator, as well as additional variables, such as a cost-of-sale amount. Such variables can be numeric or subjective attributes of the User, sale, or any other aspect of the interaction and resulting transaction. This data can be manually entered by the Operator, such as the number and level of agents involved in the interaction. Numeric figures can also be automatically calculated by the Tracker based on predefined constants. For instance, the Tracker can use the original chat duration or number of messages, multiplied by a preset cost-per-time or cost-per-message configured by the Operator, to calculate the cost of sale. Furthermore, the Tracker can subtract the cost from revenues to arrive at a profit figure, and send such figure as the transaction value, if desired.

Figure 13:
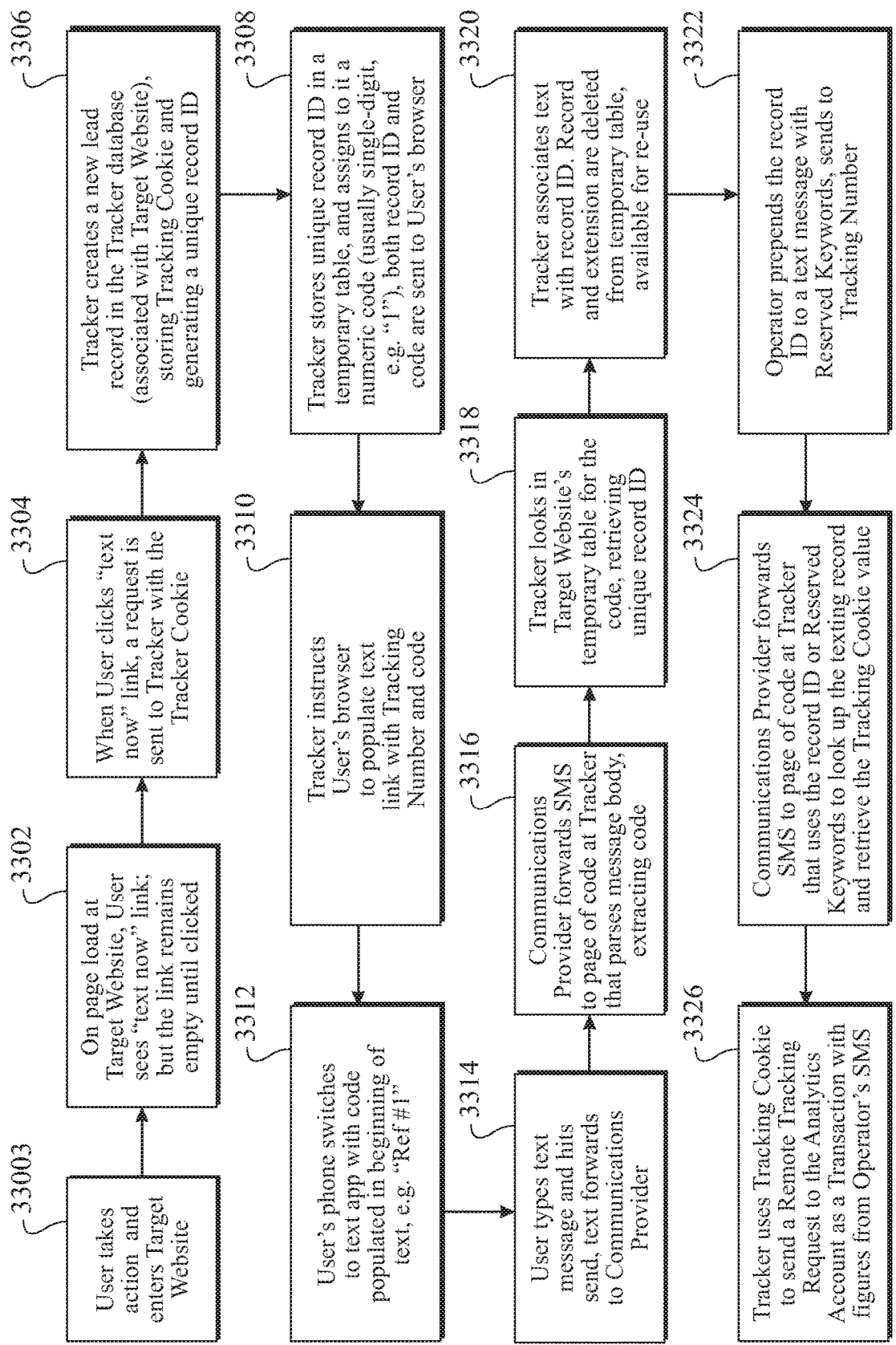
FIG. 13 presents an exemplary flowchart illustrating a method for tracking a text message conversation, and using SMS to record data about financial transactions occurring during and/or after the conversation.

Another embodiment, shown in FIG. 13, utilizes a similar method to the one described above with respect to FIG. 12 except that the Operator is given the option to update the record with financial transactions by communicating with the Tracker using SMS. Steps 3300-3320 are similar to steps 3200-3220 in FIG. 12. At step 3322, following a disconnection of the chat or end of text message session, the Tracker can instruct Communications Provider to initiate a SMS to the Operator's telephone number with instructions on replying to the Tracker (e.g. "Reply with [PHONE] 202-555-0169 in beginning of SMS") in such a way that the Tracker can interpret the Operator's reply and trigger a Remote Tracking Request. Specifically, the Operator's SMS can be sent to a telephone number at the Communications Provider, which can forward to a page of code at the Tracker. In the original text message body, the Tracker can include an identifying variable, such as the record ID or the User's telephone number. When replying to the Tracker's SMS, the Operator can include the identifying variable, sale revenue, and similar pertinent information formatted according to a predetermined standard, which can allow the Tracker to utilize such data to search for the correct record, retrieve the Tracking Cookie, and initiate the Remote Tracking Request.

For instance, the Tracker can assign reserved keywords, such as PHONE, SALE, PROFIT, ID, or similar. These keywords can be formatted in a distinguishing manner, for example, enclosed in brackets, e.g. [PHONE], [SALE], [PROFIT], [ID]. the Tracker can search the SMS for the reserved keywords, separate the text between such keywords, and use the data to populate the relevant information for the Remote Tracking Request. For example, at step 3324, the Operator can reply, "[PHONE] 202-555-0169 [REVENUE] $1,000 [PROFIT] $500". At step 3326, the code at the Tracker can receive the SMS, can discern that the text between [PHONE] and [REVENUE], or 202-555-0169, is the User's telephone number, and can use this value to search for the record and obtain the associated Tracking Cookie. Using a similar method for the remaining text message body, the Tracker can interpret the SMS as a need by the Operator to record a $1,000 revenue transaction with $500 profit for the Tracking Cookie associated with 202-555-0169. The Tracker then can proceed to send to the Analytics Account a Remote Tracking Request with the financial transaction in step 3326. The Tracker can also combine information from the Operator's SMS with figures automatically calculated by the Tracker based on predefined constants. For instance, the Operator can enter the revenue, while the Tracker can use the original chat duration or number of text messages to calculate the cost, as described earlier.

Note that this method can also be adapted for tracking off-site marketing properties, as described in FIG. 9. To accomplish this, when creating a lead record, the Tracker can generate a lead ID, an additional variable that can later substitute for the Tracking Cookie. For the Remote Tracking Request, the Tracker can retrieve the lead ID associated with the record, as well as the ad ID and related information, and can use this information in lieu of the Tracking Cookie and source, respectively, to initiate a Remote Tracking Request, which can be recorded as a financial transaction. Although a name field corresponding to each source at the Tracker is described, additional fields can be added to fully describe the source. For instance, Analytics Account could record the Document Referrer, Campaign Name, Campaign Source, Campaign Medium, Campaign Keyword, Campaign Content, and Campaign ID, among other variables. When the Analytics Account records such data, the Tracker can allow the Operator to describe each off-site marketing activity in detail, and can populate this information when sending Remote Tracking Requests related to the conversation that was triggered by each marketing activity.

Figure 14:
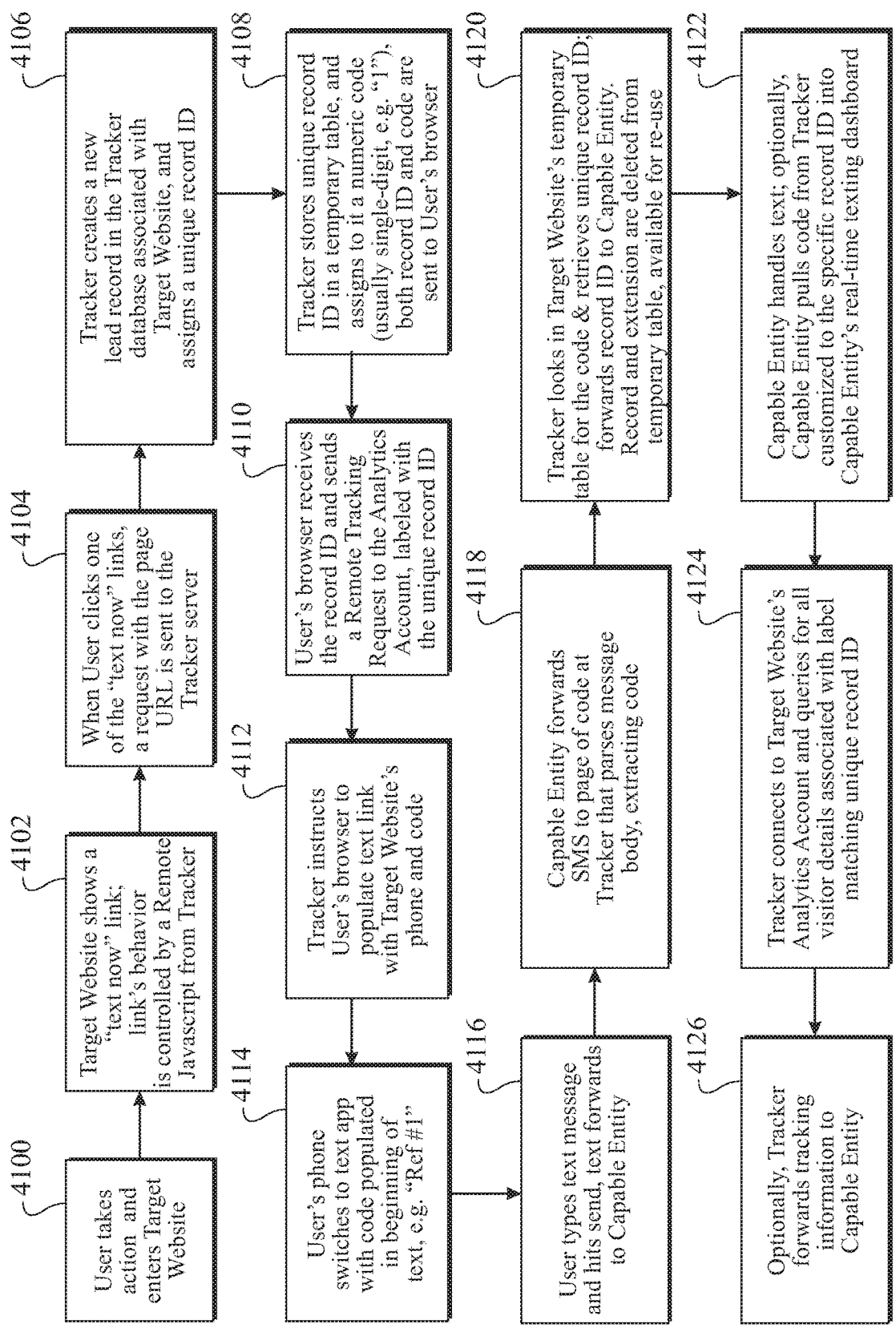
FIG. 14 presents an exemplary flowchart illustrating a method for tracking a text message conversation using remote communication.

In another embodiment, shown in FIG. 14, the Tracker communicates remotely with a Capable Entity. This allows for text messages to route directly to Business, eliminating network costs incurred by the Tracker for passing text messages through its network. Steps 4100-4116 are similar to steps 100-116 in FIG. 2, with the text message in step 4116 forwarding to the Capable Entity, rather than the Communications Provider. In step 4118, the Capable Entity can forward details of the text to the Tracker, which can parse the body of the text message and extract the temporary code. Alternatively, the Capable Entity can extract the temporary code on its own, and forward only the code to the Tracker. Step 4120 is similar to step 120 in FIG. 2, with the Tracker forwarding to the Capable Entity the record identification code. Alternatively, the Capable Entity can generate its own ID, and can communicate the ID to the Tracker together with the text message or temporary code. The Tracker would store this ID as associated with its own record ID. Thus, the systems may communicate using an ID generated by either party.

At step 4122, the Capable Entity handles the conversation as usual. Optionally, the Capable Entity can use the record ID to source a section, or module, of the Capable Entity's dashboard from the Tracker, which can use the record ID to customize the code of such a module to the specific record. For instance, such a module can provide the option of applying tags, or nicknames, to a record. When submitted, the tags can be sent to the Tracker together with the record ID, which can be used to apply the tags to the record, and can be included in communications with the Analytics Account, as detailed below. In step 4124, the Tracker can connect to the Analytics Account and query for all visitor details associated with the label corresponding to the record ID. At step 4126, the Tracker can optionally forward such details together with the record ID to Capable Entity, which can choose to store them in its database.

Alternatively, the value of a Tracking Cookie can be included in the request to the Tracker at step 4104. The Tracker can store the Tracking Cookie as associated with the new record ID in step 4106, and can use it together with the ID associated with the Analytics Account to send a Remote Tracking Request to the Target Website's Analytics Account (such as a remote trackEvent request in GOOGLE ANALYTICS) when Capable Entity communicates the related temporary code. This Remote Tracking Request optionally replaces the browser-based request in step 4110. The Analytics Account ID, a fixed variable, can be stored in the Tracker's database.

Figure 15:
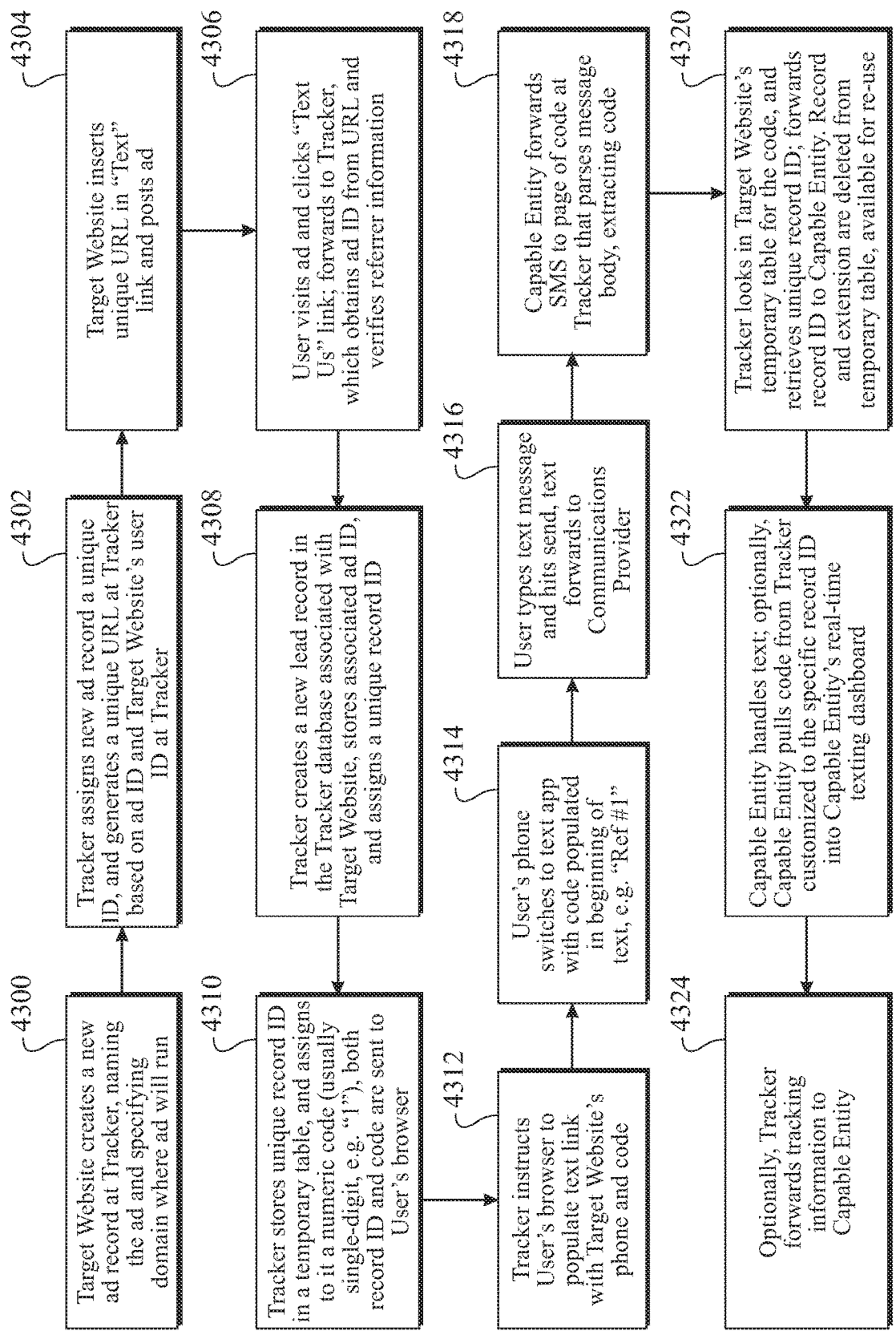
FIG. 15 presents an exemplary flowchart illustrating a method for tracking a text message conversation using remote communication, where a text message originates from network content other than a business' website.

Yet another embodiment, shown in FIG. 15, utilizes a similar method to the one described above with respect to FIG. 14 except that it enables tracking text messages that originate on properties other than the Target Website. For instance, the method can be used to track text messages that originate in e-mail campaigns, social media, and other similar off-site entities managed by Business. Steps 4300-4308 are similar to steps 700-708 in FIG. 9. The remaining steps, 4310-324, are similar to steps 4108-4126 in FIG. 14, with no intermediate Remote Tracking Request (step 4110). Alternatively, when creating a record, the Tracker can generate a lead ID. The Tracker can later use this lead ID in lieu of the Tracking Cookie to send a Remote Tracking Request with the ad name entered by the Operator as the visit source, allowing data associated with text messages from off-site sources to be recorded within the Analytics Account.

Figure 16:
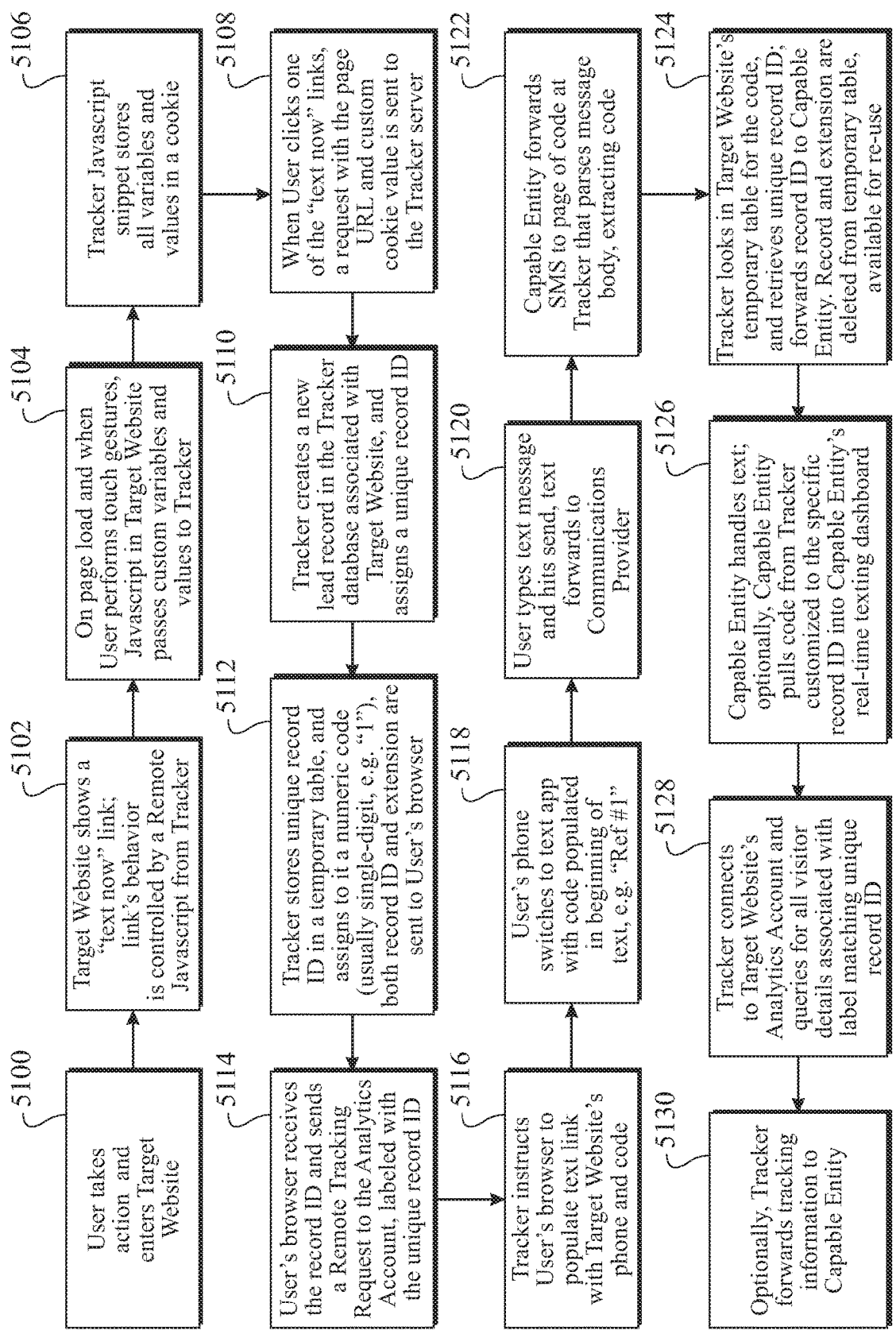
FIG. 16 presents an exemplary flowchart illustrating a method for tracking a text message conversation where custom-collected information is attached to the conversation.
Figure 17:
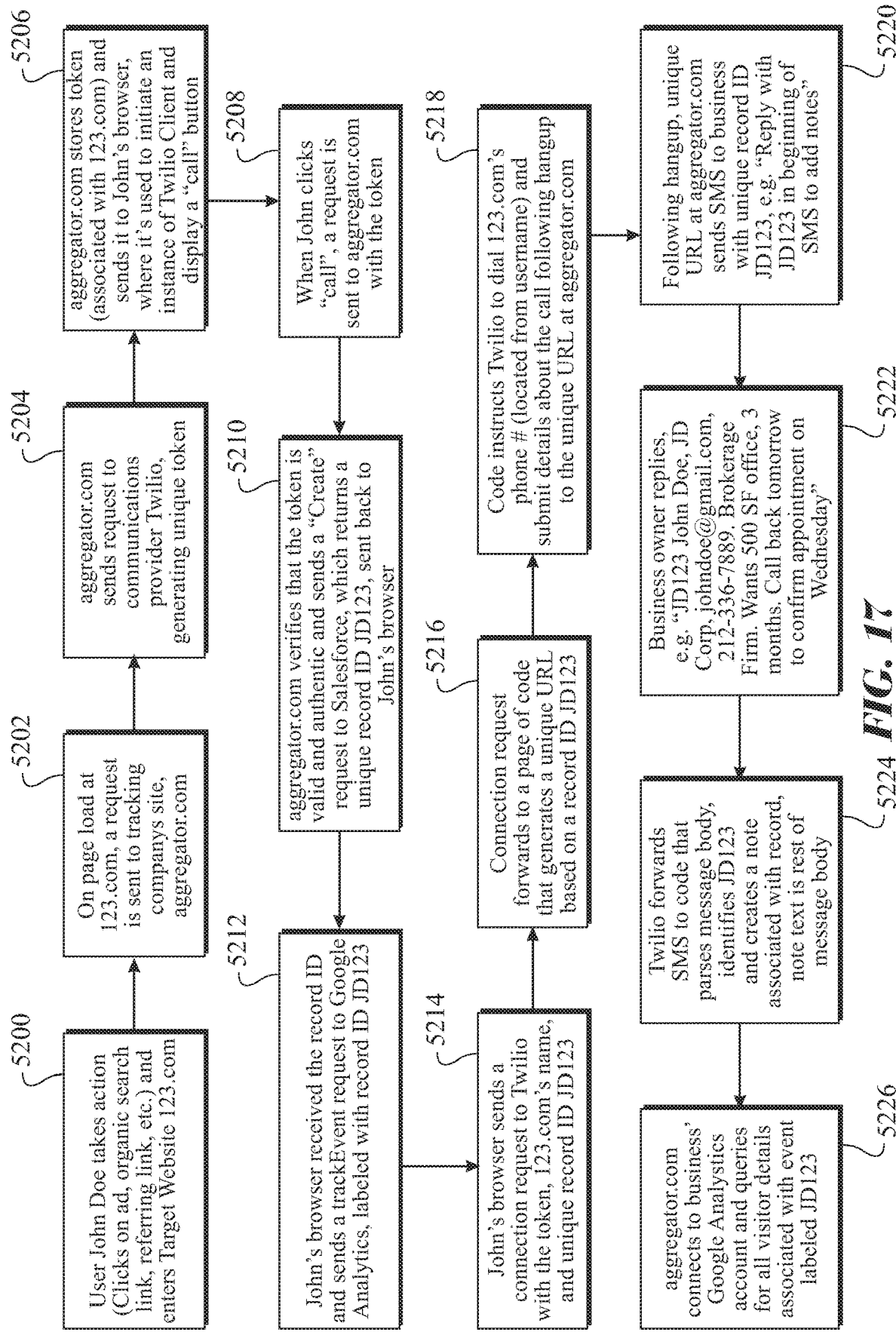
FIG. 17 presents an exemplary flowchart illustrating a method utilizing short message service (SMS), where the SMS allows a business to associate a phone call with visitor data by communicating with the tracking company via text messages and to send updates about a user record.

A final embodiment, shown in FIG. 16, utilizes a similar method to the one described above with respect to FIG. 2 except that it allows Business to track custom information about each lead. Such information can be related to and/or inferred from the User's actions on the Target Website, including a selected language, view customization, product selection, etc. This information can then be shown to the Operator handling the text message, and displayed in reports. Optionally, this information can also be used to verify at least one of (a) the User's identity and (b) infer User's intentions. Thus, a Capable Entity can use the information to automatically route the text message to the appropriate Operator.

Steps 5100-5102 are similar to steps 4100-4102 in FIG. 15. At step 5104, on page load at the Target Website, and following any subsequent touch gestures the User performs (or at preset intervals), the Target Website can send custom information to the Tracker through a JAVASCRIPT function. For instance, the User can see a Language drop-down. When the User selects Spanish, the Target Website can pass to the Tracker a variable-value pair such as, "language=Spanish". Multiple variable-value pairs can be passed in an associative array. Values can be obtained from the array, cookies established by the Target Website, or a URL, among other sources. When passing the variables, the Target Website can instruct the Tracker to replace all previously stored custom information, add to existing information, or overwrite the old variables while keeping the other variables intact. In step 5106, the Tracker can receive the information and can store, or can update, its value in a cookie. Variable-value pairs can be separated by a predetermined delimiter, such as a "|" or "–" character. For instance, a cookie value for language=Spanish and product=cellphone can be stored as "language=Spanish|product=cellphone". When the User clicks "Text" at step 5108, a JAVASCRIPT can execute, which can collect the latest custom cookie value and send it to the Tracker. The Tracker can create a new blank record in its database, associated with the Target Website, can populate it with the custom information, and can generate a record ID at step 5110. The remaining steps, 5112-5130, are similar to steps 4108-4126 in FIG. 15.

In yet another embodiment of the present invention, the method can be adapted to utilize short message service (SMS). SMS allows a business to associate a phone call with visitor data by communicating with the tracking company via text messages. The same method can be used to send updates about a user record. This embodiment is illustrated in FIG. 8 as a flowchart. In the illustrated embodiment, a user executes an action at step 5200 that takes the user to a business' website, such as clicking on an ad, clicking on a search link, or clicking on a referring link, etc. Next a request is sent to a tracking company's website once the business' website has loaded at step 5202. The tracking company's website then sends a request at step 5204 to a communications provider, such as Twilio, which in turn generates a unique token that is associated with the business' website. At step 5206, the tracking company's website stores the token associated with the business' website and sends it to the user's browser, where it is used to display a "call" link. If the communication provider used is Twilio, the token would be used to initiate an instance of Twilio Client, which enables phone calls to be made through a user's browser, and would display a "call" link or button on the website page. User then clicks the "call" link at step 5208 and a request is sent to the tracking company's website with the token associated with the business website. At step 5210, the tracking company's website verifies that the token associated with the business' website sent by the user is valid and authentic. If the token is determined to be valid and authentic, the tracking company website sends a "create" request to the external leads management system, such as Salesforce, which returns a unique record identification code. This unique record identification code is then sent back to the user's browser. If the token is determined not to be valid and authentic, the tracking company website will ignore the request, as it is not associated with an actual visit to the website. The token is used to protect the business from unauthorized phone calls initiated by hackers or malicious software. The user's browser receives the unique record identification code at step 5212 and sends a trackEvent request to Google Analytics, or any analytics system that uses unique values to identify users and visits, labeled with the unique record identification code. The user's browser then sends a connection request with the token, the business' name and the unique record identification code to a communications provider, such as Twilio, at step 5214. This connection request forwards to a page of code at step 5216 that generates a unique URL based on the unique record identification code. The code instructs the communications provider, such as Twilio, at step 5218 to dial the business' phone number, which is located in the tracking company's database, and to submit details about the call following termination of the phone call to the unique URL at the tracking company's website. Following phone call termination, the unique URL at the tracking company's website sends a SMS to the business with the unique record identification code. For example, the SMS may read, "reply with (unique record identification code) in beginning of SMS to add notes" at step 5220. The business owner then replies at step 5222 to the SMS. For example, the business owner may reply "(unique record identification code) John Doe, JD Corp, johndoe@gmail.com, 212-336-7889, Brokerage Firm, Wants 500 SF office, 3 months, Call back tomorrow to confirm appointment on Wednesday." The communications provider, such as Twilio, forwards the SMS to a page of code that parses the message body, separating the record identification code from the rest of the message. The code then identifies the customer associated with the unique record identification code, and creates a note associated with the record, using the latter portion of the message—everything after the record identification code—for the note text at step 5224. Finally, the tracking company's website connects to the business's Google Analytics account at step 5226 and queries for all visitor details associated with the event labeled with the unique record identification code. Google Analytics and Salesforce are only used for illustrative purposes, and any external lead management system that allows for remote updates of data and analytics system that uses unique values to identify users and visits may be used.

In yet another embodiment of the present invention, the method can be adapted to utilize e-mail. E-mail allows a business to associate a phone call with visitor data by communicating with the tracking company via e-mail messages. The same method can be used to send updates about a user record. This embodiment is illustrated in FIG. 9 as a flowchart. This method follows steps 5200-5218 as described above for FIG. 8. Following phone call termination, the unique URL at the tracking company's website sends an e-mail from the tracking company's e-mail address to the business with the unique record identification code. For example, the e-mail may say "reply with (unique record identification code) in subject of e-mail to add notes" at step 5228. The business owner then replies at step 5230 to the e-mail. For example, the business owner may reply with message subject "(unique record identification code)" and body "John Doe, JD Corp, johndoe@gmail.com, 212-336-7889, Brokerage Firm, Wants 500SF office, 3 months, Can back tomorrow to confirm appointment on Wednesday." The tracking company's e-mail address forwards all incoming messages to a page of code that parses the message, identifies the customer associated with the unique record identification code from the subject, and creates a note associated with the record, using the e-mail message body for the note text at step 5232. Finally, the tracking company's website connects to the business's Google Analytics account at step 5234 and queries for all visitor details associated with the event labeled with the unique record identification code. Google Analytics and Salesforce are only used for illustrative purposes, and any external lead management system that allows for remote updates of data and analytics system that uses unique values to identify users and visits may be used.

An exemplary schematic diagram detailing interactions between users 6040 and providers is illustrated in FIG. 19. The user 6040 is representative of a user and a browser enabled computing device, such as a computer, a portable computing tablet, a Smartphone, and the like, wherein the browser enabled computing device additionally includes a capability for transmitting text messages, including Short Message Service (SMS), Multimedia Messaging Services (MMS) messages, and the like). The general concept of the present invention is to provide a mechanism for identifying a user or visitor to a website 6036 presented through a web server 6030 and retaining the association between a plurality of entities. The system and method additionally enables tracking of the user's activities and correspondences through a text messaging using the same identifier or a similar identifier. The web server 6030 includes a network connected server 6032 in communication with an associated web server digital data storage device 6034. The web server digital data storage device 6034 stores and manages one or more websites 6036 and any associated data.

The user 6040 requests to view a webpage in accordance with a request 6038 from a web server 6030. The web server 6030 returns source information to the user 6040 by way of a source transfer communication 6049. A data management company server 6022 operated by a data management company 6020 establishes a user level identifier 6026 and forwards the user level identifier 6026 to the user 6040 by way of a communication link 6028. Information would be stored on a data management company digital storage device 6024, wherein the data management company digital storage device 6024 is in signal communication with the data management company server 6022.

The requested webpage includes at least one link for establishing a text messaging link 6046. The text messaging recipient link 6046 includes at least one of the tracking identifier 6015 and the user level identifier 6026, which is introduced by a tracking company 6010 and/or a data management company 6020. This is accomplished by placing a code snippet 6016 on at least one website 6036 on the web server 6030 at any reasonable point in time. The transfer is accomplished using a source transfer communication 6049. The code snippet 6016 can be introduced prior to, during, or after the transfer of the source code of the website 6036. The code snippet 6016 can be transferred to the web server 6032, the user 6040, or any other suitable location to provide the desired solution. In the exemplary embodiment, the code snippet 6016 is transferred to the user 6040 via a snippet communication link 6011.

In one exemplary solution, at least one of the tracking identifier 6015 and the user level identifier 6026 is appended to the text messaging link 6046 by the code snippet 6016 after the web page is forwarded to the user 6040. In one variant of the process, the process can append a permanent or temporary tracking identifier to the text messaging link 6046. If a temporary identifier is used, the temporary identifier is exchanged with a permanent identifier when text message 6047 is sent to the recipient, such as an inquiry management server 6002 by way of a text message communication link 6048, the tracking company 6010 by way of a text message communication link 6041, or any other suitable recipient. The combination including the appended permanent identifier would be stored as the record.

The user 6040 selects the text messaging link 6046, such as a click link 6045 in the illustration, which activates a click-to-text request. Once the text messaging link 6046 is selected, the system initiates transmission of a text message, including the associated user level identifier 6026. The combination of the text message and the user level identifier 6026 are submitted to the inquiry management server 6002 operated by an inquiry management provider 6000. The transmitted text message can optionally include additional information provided by the at least one of the user and the system. The collective received information is stored on an inquiry management digital storage device 6004, wherein the inquiry management digital storage device 6004 is in signal communication with the inquiry management server 6002.

In one practice, the user 6040 is subsequently connected to an agent 6050 by any suitable communication link (not shown). Examples of communication links can include a text message, an e-mail, in-person, a telephone call, transfer to a different website, or any other communication link. In one variant, the communication between parties is accomplished using an offline communication process. The records 6056 would be generated by the agent, an automated record generation process, or any other suitable process. The agent 6050 forwards the collected data activity records 6056 of follow up activities to the inquiry management provider 6000, referenced as a user-agent activities records transfer 6059.

A tracking company server 6012, operated by a tracking company 6010, would transmit an application programming interface ("API") 6019 request to the inquiry management provider 6000 in accordance with a request communication 6018. The tracking company 6010 subsequently responds by forwarding the data collected from the agent 6050 to the tracking company server 6012 in accordance with a data request response or data transfer communication 6008. The tracking company 6010 collects and stores the received records 6057 on a tracking company digital data storage device 6014. The stored records 6058, including the associated user level identifier 6026, are forwarded to the data management company 6020 for future use, wherein the conveyance of the stored records 6058 is accomplished via a data transfer communication link 6017. When a tracking identifier 6015 is used, the user level identifier associated with the tracking identifier 6015 is first located, and then used to forward the stored records 6058 to the data management company 6020.

In summary, the method overcomes deficiencies in the art by enabling chat and text messages to be tracked. The method can also be applied to other applications where off-line activities are manipulated to be presented as on-line activities. This allows the system to capture valuable data from the analytics system, such as visitor source information. Incorporating an ID throughout the method allows Business to "drill down" into visitor data, attributing each interaction to a specific marketing channel, geographic location, device, etc. The described features are not mutually exclusive; each Business can select as few or as many of the options to fit its needs and/or preferences.

The above-described methods can be implemented in a system that can include one or more non-transitory computer readable storage mediums with instructions stored thereon that when executed by a computing system cause the computing system to perform the above-described operations.

Each of the methods described herein with reference to the accompanying figures can be implemented as a system including one or more servers providing data related to the website and the database, wherein each server comprises at least one computing system having at least one data processor. The above-described methods according to the technology introduced here can be implemented as devices and/or systems including multiple devices.

For example, the methods described herein can be implemented in hardware, firmware, or as software or computer code that can be stored in a recording medium such as a CD-ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that can store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although the invention herein has been described with reference to particular embodiments, it is to be understood that these embodiments are merely illustrative of the principles and applications of the technology introduced here. For example, the term "business" is not limited to a business but can include any entity having an online or Internet presence in the form of a website. It is to be understood that unless otherwise indicated herein, the order in which the steps of the figures are described is not intended to require that such steps be performed in the order in which they are described. It is therefore to be understood that numerous modifications can be made to the illustrative embodiments and that other arrangements can be devised without departing from the spirit and scope of the present invention. It is understood, therefore, that this invention is not limited to the particular embodiments disclosed, but it is intended to cover modifications that are within the spirit and scope of the invention. Furthermore, material appearing in the background section of the specification is not an admission that such material is prior art to the invention.

The disclosure presented above teaches a system for acquiring data and other information associated with a chat session and/or a text message. The disclosure presented in Parent Application United States Non-Provisional Utility Application Ser. No. 14/524,949, filed on Oct. 27, 2014 (issued as U.S. Pat. No. 9,137,360 on Sep. 15, 2015), teaches a system for acquiring data and other information associated with an audio call. The disclosure presented in another Parent Application United States Non-Provisional Utility Application Ser. No. 14/854,204, filed on Sep. 15, 2015 (issued as U.S. Pat. No. 9,342,843 on May 17, 2016), teaches a system for acquiring data and other information associated with a form. Collectively, these can be referred to as an event.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. A network system comprising:
   a first computer system comprising a microprocessor, a digital memory device, and a communication circuit;
   a plurality of user computers comprising a microprocessor, a digital memory device, and a communication circuit, the user computer being networked to digitally communicate with the first computer system;
   a second computer system comprising a microprocessor, a digital memory device, and a communication circuit, the second computer system being networked to digitally communicate with the first computer system;
   an external computer system comprising a microprocessor, a digital memory device, and a communication circuit, the external computer system being networked to digitally communicate with each user computer of the plurality of user computers, the external computer system being networked to digitally communicate with the first and second computer systems;
   wherein, in operation:
   the external computer system hosts at least one website, accessed by at least one of the plurality of user computers;
   the first computer system stores and maintains a first database of records in the first computer digital memory device, each record in the first database of records corresponds to an access of a website hosted by the external computer system made by a respective user computer of the plurality of user computers, each record identified by an identifier;
   the second computer system stores and maintains a second database of records, each record of the second database of records containing user related information, wherein at least one record in the second database of records is created containing information obtained from an event initiated by a respective user computer of the plurality of user computers,
   wherein the event is initiated by a user while accessing a respective website of the at least one website;
   wherein the at least one record of the second database of records in the second computer system and resulting from the event, contains the identifier associated with the website access associated with the event, and
   wherein the first computer system is configured to use the identifier to associate at least one record from the second computer system with at least one record, associated with the same identifier, from the first computer system.

2. The network system as recited in claim 1, wherein the event is one of the following:
   (a) an audio call,
   (b) a text message,
   (c) a chat message,
   (d) a form submission, or
   (e) an action associated with a website session.

3. The network system as recited in claim 1, the second computer system further being configured to store additional information, wherein the additional information is information other than the information obtained from the event, wherein the additional information is appended to the at least one record after the record is created.

4. The network system as recited in claim 1, wherein, in operation, at least one of:
(a) the respective user computer of the plurality of user computers obtains the identifier from the first computer system and appends the identifier to data entered through the respective user computer of the at least user computer to complete the event; and
(b) the external computer system obtains the identifier from the first computer system and appends the identifier to data entered through the respective user computer of the at least user computer to complete the event.

5. The network system as recited in claim 1, the first computer system further being configured to collect the user related information stored within the associated record of the at least one record at the second computer system and display the collected user related information in conjunction with the information from the record associated with the same identifier at the first computer system.

6. The network system as recited in claim 1, wherein the first computer system is a web activity tracking system, wherein the second computer system is a customer relationship management system.

7. The network system as recited in claim 1, further comprising a third computer system;
where the first computer system includes an instruction set that associates the respective record of the at least one record from the second computer system with a second identifier generated by the third computer system and uses the second identifier to associate a record at the third computer system with the record at the first computer system.

8. The network system as recited in claim 1, further comprising an instruction set that appends the identifier to at least one of the event and the event information as one of:
(a) a prefix of a data string generated from the at least one of the event and the event submitted information;
(b) an intermediary segment of a data string generated from the at least one of the event and the event submitted information; or
(c) a suffix of a data string generated from the at least one of the event and the event submitted information.

9. The network system as recited in claim 1, further comprising at least one third computer system;
the second computer system further comprising an instruction set that transfers the stored record of the second database of records stored on the second computer system to the at least one third computer system, and
wherein at least one of:
(a1) the first computer system and
(a2) the at least one third computer system,
further comprising an instruction set that utilizes the identifier to associate at least one record from at least one of:
(b1) the second database of records stored on the second computer system, and
(b2) one computer system of the at least one third computer system,
with at least one record associated with the same identifier, stored on at least one of:
(c1) the first computer system, and
(c2) one or another computer system of the at least one third computer system.

10. The network system as recited in claim 1, the first computer system further comprising an instruction set that receives at least one of:
(a) the event submitted information from the respective record of the at least one record in the second database of records stored on the second computer system, and
(b) additional information associated with the same identifier associated with the respective record of the second database of records stored on the second computer system.

11. The network system as recited in claim 1, the first computer system further comprising an instruction set that retrieves at least one of:
(a) the event submitted information from the respective record of the at least one record in the second database of records stored on the second computer system, and
(b) additional information associated with the same identifier associated with the respective record of the second database of records stored on the second computer system.

12. A network system comprising:
a first computer system and a second computer system, each system comprising a microprocessor, a digital memory device, and a communication circuit;
a plurality of user computers comprising a microprocessor, a digital memory device, and a communication circuit, the user computer being networked to digitally communicate with the first and second computer systems;
an external computer system comprising a microprocessor, a digital memory device, and a communication circuit, the external computer system being networked to digitally communicate with each user computer of the plurality of user computers, the external computer system being networked to digitally communicate with the first and second computer systems;
wherein the first computer system is configured to:
(A) receive a request from one of the external computer system and the user computer system corresponding to access of a website hosted on the external computer,
(B) issue an identifier in response to the request, and
(C) associate the identifier with website access related information, wherein the website access related information includes information related to access of the website hosted on the external computer; wherein, at least one of the external computer system and the user computer system includes an instruction set that associates the identifier with one of:
(I) an event reference established on one of the external computer system or the user computer system, and
(II) data entered to complete the event,
such that when the event is initiated, the identifier is stored on the second computer system, and a record associated with the event submitted information entered to complete the event is stored on the second computer system,
wherein an association between the identifier stored on the second computer system and the record associated with the event submitted information entered to complete the event stored on the second computer system is provided on the second computer system, the first computer system further comprising an instruction set comprising the following instructions:
(i) access the stored record stored on the second computer system to retrieve additional information, collected from sources other than a website hosting the event reference, that has been appended to the record, and
(ii) use the identifier to associate the additional information associated with the completed event from the second computer system with the data collected by the first computer system.

13. The network system as recited in claim 12, wherein the event is one of the following:
(a) an audio call,
(b) a text message,
(c) a chat message,
(d) a form submission, or
(e) an action associated with a website session.

14. The network system as recited in claim 12, the first computer system further comprising an instruction set that collects information from the associated record stored on the second computer system and displays the collected information in conjunction with the information from the record associated with the same identifier at the first computer system.

15. The network system as recited in claim 12, wherein the first computer system is a web activity tracking system, wherein the second computer system is a customer relationship management system.

16. The network system as recited in claim 12, the first computer system further comprising an instruction set that receives at least one of:
(a) the event submitted information from the respective record stored on the second computer system, and
(b) additional information associated with the same identifier associated with the respective record stored on the second computer system.

17. The network system as recited in claim 12, the first computer system further comprising an instruction set that retrieves at least one of:
(a) the event submitted information from the respective record stored on the second computer system, and
(b) additional information associated with the same identifier associated with the respective record stored on the second computer system.

18. The network system as recited in claim 12, further comprising at least one third computer system;
the second computer system further comprising an instruction set that transfers the record stored on the second computer system to the at least one third computer system, and
wherein at least one of:
(1a) the first computer system and
(1b) the at least one third computer system,
further comprising an instruction set that utilizes the identifier to associate at least one record from at least one of:
(2a) the second computer system, and
(2b) one computer system of the at least one third computer system,
with at least one record associated with the same identifier, stored on at least one of:
(3a) the first computer system, and
(3b) one or another computer system of the at least one third computer system.

19. The network system as recited in claim 12, further comprising a third computer system;
the first computer system further comprising an instruction set that associates the respective record of the at least one record from the second computer system with a second identifier generated by the third computer system and uses the second identifier to associate a record at the third computer system with the record at the first computer system.

20. The network system as recited in claim 12, wherein the instruction set that appends the identifier to at least one of the event and the event submitted information is accomplished by appending the identifier as one of:
(a) a prefix of a data string generated from at least one of the event and the event submitted information,
(b) an intermediary segment of a data string generated from at least one of the event and the event submitted information, or
(c) a suffix of a data string generated from at least one of the event and the event submitted information.

21. A network system comprising:
a first computer system, a second computer system, and a third computer system, each system comprising a microprocessor, a digital memory device, and a communication circuit;
a plurality of user computers, each user computers of the plurality of user computers comprising a microprocessor, a digital memory device, and a communication circuit, each user computer of the plurality of user computers being networked to digitally communicate with the first and second computer systems;
an external computer system comprising a microprocessor, a digital memory device, and a communication circuit, the external computer system being networked to digitally communicate with each user computer of the plurality of user computers, the external computer system being networked to digitally communicate with the first and second computer systems;
wherein the first computer system is configured to:
(A) receive a request from one of the second computer system and the user computer system corresponding to access of a website hosted on an external computer,
(B) issue an identifier in response to the request, and
(C) associate the identifier with website access related information, wherein the website access related information contains information related to access of the website hosted on the external computer;
wherein at least one of the external computer system, the user computer systems, and the third computer system includes an instruction set that associates the identifier with one of:
(I) an event reference established on one of the external computer system, the third computer system, or the user computer system, and
(II) the data entered to complete the event,
such that when the event is initiated, the identifier is stored on the second computer system, and a record associated with the event submitted information entered to complete the event is stored on the second computer system;
wherein an association between the identifier stored on the second computer system and the record associated with the data entered to complete the event stored on the second computer system is provided on the second computer system;
wherein at least one of the first computer system and the third computer system is configured to:
(i) access the record stored on the second computer system to retrieve additional information, collected from sources other than a website hosting the event reference, that has been appended to the record, and (ii) use the identifier to associate the additional information associated with the completed event from the second computer system with the data collected by at least one of the first computer system and the third computer system.

22. The method as recited in claim 21, wherein the event is one of the following:
(a) an audio call,
(b) a text message,
(c) a chat message,
(d) a form submission, or
(e) an action associated with a website session.

23. The network system as recited in claim 21, wherein at least one of the first computer system and the third computer system includes an instruction set that collects information from the associated record stored on the second computer system and displays the collected information in conjunction with the information from the record associated with the same identifier at the first computer system.

24. The network system as recited in claim 21, wherein the first computer system is a web activity tracking system, wherein the second computer system is a customer relationship management system.

25. The network system as recited in claim 21, further comprising a fourth computer system;
the first computer system further comprising an instruction set that associates the respective record of the at least one record from the second computer system with a second identifier generated by the fourth computer system and uses the second identifier to associate a record at the fourth computer system with the record at the first computer system.

26. The network system as recited in claim 21, the first computer system further comprising an instruction set that receives at least one of:
(a) the event submitted information from the respective record of the at least one record stored on the second computer system, and
(b) additional information associated with the same identifier associated with the respective record stored on the second computer system.

27. The network system as recited in claim 21, the first computer system further comprising an instruction set that retrieves at least one of:
(a) the event submitted information from the respective record of the at least one record stored on the second computer system, and
(b) additional information associated with the same identifier associated with the respective record stored on the second computer system.

28. The network system as recited in claim 21, further comprising at least one fourth computer system;
the second computer system further comprising an instruction set that transfers the record stored on the second computer system to the at least one fourth computer system, and
wherein at least one of:
(a1) the first computer system,
(a2) the third computer system, and
(a3) the at least one fourth computer system;
further comprising an instruction set that utilizes the identifier to associate at least one record from at least one of:
(b1) the record stored on the second computer system,
(b2) the third computer system, and
(b3) one computer system of the at least one fourth computer system;
with at least one record associated with the same identifier, stored on at least one of:
(c1) the first computer system,
(c2) the third computer system, and
(c3) one or another computer system of the at least one fourth computer system.

29. The network system as recited in claim 21, the instruction set that associates the identifier with at least one of the event and the event submitted information appending the identifier as one of:
(a) a prefix of a data string generated from at least one of the event and the event submitted information;
(b) an intermediary segment of a data string generated from at least one of the event and the event submitted information; or
(c) a suffix of a data string generated from at least one of the event and the event submitted information.

\* \* \* \* \*